(12) United States Patent
Iwakiri

(10) Patent No.: US 11,435,020 B2
(45) Date of Patent: Sep. 6, 2022

(54) BEND PIPE AND FLUID MACHINE COMPRISING SAME

(71) Applicant: MITSUBISHI HEAVY INDUSTRIES ENGINE & TURBOCHARGER, LTD., Sagamihara (JP)

(72) Inventor: Kenichiro Iwakiri, Tokyo (JP)

(73) Assignee: MITSUBISHI HEAVY INDUSTRIES ENGINE & TURBOCHARGER, LTD., Sagamihara (JP)

(*) Notice: Subject to any disclaimer, the term of this patent is extended or adjusted under 35 U.S.C. 154(b) by 676 days.

(21) Appl. No.: 15/779,337

(22) PCT Filed: Dec. 25, 2015

(86) PCT No.: PCT/JP2015/086279
§ 371 (c)(1),
(2) Date: May 25, 2018

(87) PCT Pub. No.: WO2017/109950
PCT Pub. Date: Jun. 29, 2017

(65) Prior Publication Data
US 2018/0306365 A1 Oct. 25, 2018

(51) Int. Cl.
*F16L 43/00* (2006.01)
(52) U.S. Cl.
CPC .................. *F16L 43/00* (2013.01)
(58) Field of Classification Search
CPC ....... F16L 43/00; F16L 43/001; F16L 43/002; F16L 43/008
(Continued)

(56) References Cited

U.S. PATENT DOCUMENTS 2,056,782 A 10/1936 Fosdick
2,837,810 A 6/1958 Ekholm
(Continued)

FOREIGN PATENT DOCUMENTS

CN 1277664 A 12/2000
CN 1991226 A 7/2007
(Continued)

OTHER PUBLICATIONS

Office Action dated May 6, 2020 issued in counterpart Chinese Application No. 201580084918.1.
(Continued)

*Primary Examiner* — Aaron M Dunwoody
(74) *Attorney, Agent, or Firm* — Birch, Stewart, Kolasch & Birch, LLP

(57) ABSTRACT

A bend pipe for supplying a fluid to a fluid machine or discharging the fluid from the fluid machine, wherein, provided that: a line including a pipe axial center line of an inlet pipe portion and an extension line thereof is defined as a line L; a line including a pipe axial line of an outlet pipe portion and an extension line thereof is defined as a line M; and a direction parallel to an intersection line formed by a plane orthogonal to the line M and a plane orthogonal to the line M is defined as a direction I, and when, as seen from the direction I, a side of the line M on which the inlet pipe portion exists is defined as a front side and a side of the line M on which the inlet pipe portion does not exist is defined as a back side, a side surface on an outer side with respect to a bend direction of a bend pipe portion includes an outer inclined surface on the back side of the line M, the outer inclined surface being inclined so that a distance from the line M decreases toward a downstream side.

14 Claims, 20 Drawing Sheets

(58) Field of Classification Search
USPC .......................................................... 285/179
See application file for complete search history.

(56) References Cited

U.S. PATENT DOCUMENTS

| | | | | |
|---|---|---|---|---|
| 6,422,608 | B1* | 7/2002 | Lee | ..................... B65G 53/523 |
| | | | | 285/131.1 |
| 6,951,354 | B1 | 10/2005 | Paulsqn | |
| 2013/0061424 | A1 | 3/2013 | Lee | |

FOREIGN PATENT DOCUMENTS

| CN | 102971465 A | 3/2013 |
|---|---|---|
| EP | 0195528 A1 | 9/1986 |
| FR | 1.278.649 A | 10/1960 |
| JP | 63-32477 Y2 | 8/1988 |
| JP | 64-39426 U | 3/1989 |
| JP | 4-56200 B2 | 9/1992 |
| JP | 2002-525525 A | 8/2002 |
| JP | 2005-146866 A | 6/2005 |
| JP | 2006-307740 A | 11/2006 |
| WO | WO 98/15769 A1 | 4/1998 |
| WO | WO 00/17562 A1 | 3/2000 |
| WO | WO 2005/054737 A1 | 6/2005 |
| WO | WO 2009/127192 A1 | 10/2009 |

OTHER PUBLICATIONS

Office Action dated Apr. 2, 2020 issued to the corresponding European Application No. 15911387.7.
Extended European Search Report effective Sep. 14, 2018 issued to the corresponding EP Application No. 15911387.7.
International Preliminary Report on Patentability and Written Opinion of the International Searching Authority (Forms PCT/IB/338, PCT/IB/373 and PCT/ISA/237) for International Application No. PCT/JP2015/086279, dated Jul. 5, 2018, with English translation.
International Search Report (Form PCT/ISA/210) for International Application No. PCT/JP2015/086279, dated Mar. 22, 2016.
Office Action dated Aug. 23, 2019 In the corresponding Chinese Application No. 201580084918.1.
Office Action dated Mar. 19, 2019 issued in corresponding Japanese Patent Application No. 2017-557630.
Office Action dated Sep. 13, 2019 issued in the corresponding European Application No. 15911387.7.

* cited by examiner

S1    S2    S3

S4    S5

S1

S2

S3

S4

S5

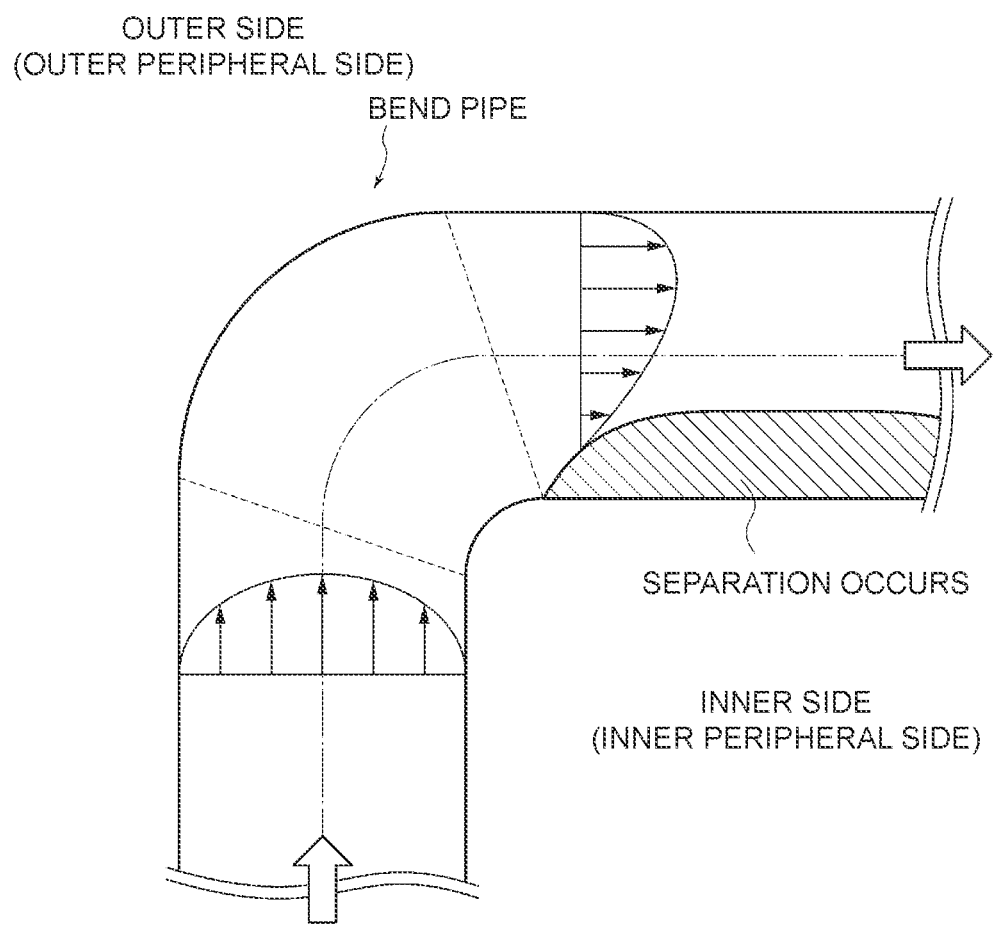

BEND PIPE AND FLUID MACHINE COMPRISING SAME

TECHNICAL FIELD

The present disclosure relates to a bend pipe and a fluid machine comprising the same.

BACKGROUND ART

For instance, an inlet pipe and an outlet pipe of a fluid machine such as a turbine and a compressor may include a bend pipe for changing the flow direction of a fluid, for the sake of layout of the apparatus.

As shown in FIG. 26, as a fluid flows through a bend pipe, the fluid may drift outward in the bend direction (outward with respect to the curvature radius) due to a centrifugal force, and separation may occur on the inner side in the bend direction (inner side with respect to the curvature radius). When such separation occurs, pressure loss occurs and the efficiency of the system decreases, with inflow of a flow deflected toward a device provided on the downstream side. Accordingly, the separation may cause deterioration of the efficiency of the device.

Patent Document 1 focuses on occurrence of outward drift in the bend direction at the outlet of the bend portion (bend pipe portion) of the bend pipe, and discloses, as shown in FIG. 27A, eccentrically forming the joint line between the inlet pipe portion (upper portion draft) and the bend portion of the bend pipe outward in the bend direction. Accordingly, the velocity of the outward flow in the bend direction of the bend pipe is reduced, so as to achieve a uniform velocity distribution.

CITATION LIST

Patent Literature

Patent Document 1: JP2006-307740A

SUMMARY

Problems to be Solved

While the bend pipe disclosed in Patent Document 1 has an effect to reduce the velocity of a flow on the outer side in the bend direction of the bend pipe, a thick boundary layer develops from the vicinity of the inlet of the bend portion at the inner side of the bend direction as shown in FIG. 27B, which is likely to cause separation (reverse flow) midway in the bend portion. That is, in the bend pipe disclosed in Patent Document 1, the effect to suppress occurrence of separation on the inner region in the bend direction is limited.

In view of the above, an object of at least one embodiment of the present invention is to provide a bend pipe and a fluid machine including the same, whereby it is possible to suppress occurrence of separation in a region on the inner side in the bend direction.

Solution to the Problems (1) A bend pipe for supplying a fluid to a fluid machine or discharging the fluid from the fluid machine, according to at least one embodiment of the present invention, includes: an inlet pipe portion having a linear shape; a bend pipe portion connected to a downstream end of the inlet pipe portion and configured to change a flow direction of the fluid; and an outlet pipe portion having a linear shape connected to a downstream end of the bend pipe portion. Provided that: a line including a pipe axial center line of the inlet pipe portion and an extension line thereof is defined as a line L; a line including a pipe axial line of the outlet pipe portion and an extension line thereof is defined as a line M; and a direction parallel to an intersection line formed by a plane orthogonal to the line M and a plane orthogonal to the line M is defined as a direction I, and when, as seen from the direction I, a side of the line M on which the inlet pipe portion exists is defined as a front side and a side of the line M on which the inlet pipe portion does not exist is defined as a back side, a side surface on an outer side with respect to a bend direction of the bend pipe portion includes an outer inclined surface on the back side of the line M, the outer inclined surface being inclined so that a distance from the line M decreases toward a downstream side.

With the above bend pipe (1), the direction of a flow after passing the bend pipe portion is inclined from the line M so as to move inward in the bend direction of the bend pipe toward the downstream side. As a result, with the flow moving in the direction inclined as described above, it is possible to suppress development of a separation flow that occurs in the region on the inner side of the bend direction of the bend pipe by quickly making a separation flow adhere again to the inner side, or to suppress occurrence itself of the separation flow.

(2) In some embodiments, in the above bend pipe (1), as seen from the direction I, a maximum value $\alpha 1$ of an inclination angle formed by the outer inclined surface with a line parallel to the line M is not smaller than 10°.

With the bend pipe described in the above (2), it is possible to increase the inclination of the direction of the flow after passing the bend pipe portion from the line M to some extent, and thus it is possible to suppress development or occurrence of a separation flow in the inner region with respect to the bend direction of the bend pipe with a high effectiveness.

(3) In some embodiments, in above bend pipe (1) or (2), a pipe axial center line of the bend pipe portion has a back-side eccentric portion offset from the line M toward the back side.

With the bend pipe described in the above (3), it is possible to easily increase the inclination of the direction of the flow after passing the bend pipe portion from the line M, and thus it is possible to suppress development or occurrence of a separation flow in the inner region with respect to the bend direction of the bend pipe.

(4) In some embodiments, in the above bend pipe (3), a diameter De of the outlet pipe portion and a distance $\delta 1$ between the line M and a portion of the back-side eccentric portion farthest from the line M toward the back side satisfy $\delta 1 \geq 0.1$ De.

With the bend pipe described in the above (4), it is possible to increase the inclination of the direction of the flow after passing the bend pipe portion from the line M to some extent, and thus it is possible to suppress development or occurrence of a separation flow in the inner region with respect to the bend direction of the bend pipe with a high effectiveness.

(5) In some embodiments, in the bend pipe described in any one of the above (1) to (4), a flow-passage cross sectional area at least in a partial section of the bend pipe portion is greater than a flow-passage cross sectional area A1 of the inlet pipe portion, and is greater than a flow-passage cross sectional area A3 of the outlet pipe portion.

The pressure loss of a fluid in a pipe passage increases in proportion to square of velocity of the fluid. Thus, for the bend pipe portion where a particularly large pressure loss is like to occur, it is desirable to increase the flow-passage cross-sectional area and reduce the flow velocity, to reduce pressure loss.

In this regard, as in the above (5), with the flow-passage cross-sectional area in at least one section of the bend pipe portion being greater than each of the flow-passage cross-sectional area A1 of the inlet pipe portion and the flow-passage cross-sectional area A3 of the outlet pipe portion, the flow velocity decreases and a centrifugal force applied to the fluid is reduced, at least in the above section of the bend pipe portion. Thus, it is possible to suppress separation on the inner side with respect to the bend direction of the bend pipe.

Furthermore, as a result of a decrease in the centrifugal force at least in a section of the bend pipe portion, deflection of a flow toward the outer side in the bend direction is reduced for the outlet pipe portion, and occurrence of a secondary flow due to the centrifugal force is also suppressed. As a result, it is possible to suppress rotation of a flow at the outlet pipe portion and the downstream side thereof, and to make the flow uniform. Thus, it is possible to suppress deterioration of efficiency of a device disposed downstream of the bend pipe.

Furthermore, also in a case where a flow originally having a rotation component enters from the inlet pipe portion, the flow-passage cross-sectional area is increased at the bend pipe portion, and thereby the rotation component is reduced, which makes it possible to make the flow uniform and reduce pressure loss.

(6) In some embodiments, in the bend pipe described in any one of the above (1) to (5), the bend pipe portion includes, at least in a partial section, a cross section on which a gravity center is positioned on an inner side, with respect to the bend direction, of a center of a flow passage width in a direction orthogonal to the direction I.

Generally, in the bend pipe portion, the flow is likely to deflect outward with respect to the bend direction, which may cause pressure loss. In view of this, as in the above (6), with the bend pipe portion including a cross section in which the gravity center is positioned on the inner side, in the bend direction, of the center of the flow-passage width in the direction orthogonal to the direction I, the fluid is less likely to flow into a region on the outer side, with respect to the bend direction, of the center of the bend pipe portion, while the fluid is more likely to flow into a region on the inner side, with respect to the bend direction, of the center. As a result, separation is reduced, and it is possible to reduce pressure loss in the bend pipe portion. Furthermore, the flow amount decreases in the region on the outer side, in the bend direction, where a centrifugal force has a strong influence, and development of the secondary flow is suppressed by inclination of the wall surface.

(7) In some embodiments, in the bend pipe described in any one of the above (1) to (6), the bend pipe portion has, at least in a partial section, a flattened shape in which a flow passage width in a direction J orthogonal to the direction I is smaller than a flow passage width in the direction I.

With the above bend pipe (7), the flow-passage width in the direction J, of the flow passage width of the bend pipe portion, is smaller than the flow-passage width in the direction I, and thereby it is possible to reduce the influence of a centrifugal force. Accordingly, it is possible to suppress a drift to a region on the outer side with respect to the bend direction of the bend pipe, and to suppress occurrence of a secondary flow.

(8) In some embodiments, in the above bend pipe (7), the flattened shape is an oval shape, a rectangular shape, or a rectangular shape with four rounded corners.

With the above bend pipe (8), it is possible to achieve the effect described in the above (7) with the bend pipe having a simple shape.

Meanwhile, as in the above bend pipe (1), in a case where the side surface on the outer side in the bend direction of the bend pipe portion has an outer inclined surface, the flow after passing through the bend pipe portion is guided to the inner side in the bend direction, and thereby it is possible to suppress separation in the inner region. On the other hand, according to findings of the present inventors, as a part of the flow toward the inner side hits the side surface on the inner side, the part of the flow may flow backward, provoking local separation on the upstream side.

(9) Thus, in some embodiments, in the bend pipe described in any one of the above (1) to (8), a side surface on an inner side with respect to the bend direction of the bend pipe portion includes an inner inclined surface on a downstream side of the outer inclined surface, the inner inclined surface being inclined so that a distance from the line M decreases toward a downstream side.

With the above configuration, the bend pipe is curved so that a part of the flow from the bend pipe portion to the outlet pipe portion flows along the inner inclined surface, and it is possible to suppress a partial reverse flow and local separation as described above.

(10) In some embodiments, in the bend pipe described in any one of the above (1) to (9), as seen from the direction I, a maximum value $\alpha 1$ of an inclination angle formed by the outer inclined surface with a line parallel to the line M and a maximum value $\alpha 2$ of an inclination angle formed by the inner inclined surface with a line parallel to the line M satisfy $\alpha 1 \geq \alpha 2$.

With the bend pipe according to the above (10), it is possible to suppress separation effectively over a broad range on the inner side with respect to the bend direction of the bend pipe.

(11) In some embodiments, in the above bend pipe (9) or (10), a pipe axial center line of the bend pipe portion has a back-side eccentric portion offset from the line M toward the back side and a front-side eccentric portion offset from the line M toward the front side on a downstream side of the back-side eccentric portion.

With the above bend pipe (10), in addition to the effect described in the above (3), the bend pipe is curved so that a part of the flow from the bend pipe portion to the outlet pipe portion flows along the inner inclined surface, and it is possible to suppress a partial reverse flow and local separation as described above.

(12) In some embodiments, in the above bend pipe (11), a distance $\delta 1$ between the line M and a portion of the back-side eccentric portion farthest from the line M toward the back side and a distance $\delta 2$ between the line M and a portion of the front-side eccentric portion farthest from the line M toward the front side satisfy $\delta 1 \geq \delta 2$.

With the bend pipe according to the above (12), it is possible to suppress separation effectively over a broad range on the inner side with respect to the bend direction of the bend pipe.

(13) In some embodiments, in the bend pipe described in any one of the above (1) to (11), at least in a partial section of the bend pipe portion, a vertex position at which a flow passage width of each cross section of the bend pipe portion is at a maximum is shifted about a pipe axial center line of the bend pipe portion toward a downstream side.

With the above bend pipe (13), even in a case where a flow that flows from the inlet pipe portion originally has a rotation component, it is possible to suppress occurrence of separation effectively in a region on the inner side with respect to the bend direction of the bend pipe.

(14) A fluid machine according to at least one embodiment of the present invention includes: an impeller wheel; a casing covering the impeller wheel; an inlet pipe connected to an upstream side of the casing, for guiding a fluid to the impeller wheel; and an outlet pipe connected to a downstream side of the casing, for discharging a fluid after passing through the impeller wheel. The inlet pipe or the outlet pipe is the bend pipe according to any one of the above (1) to (13).

With the above fluid machine (14), the bend pipe described in any one of the above (1) to (13) is provided, and thus it is possible to suppress development or occurrence of separation in a region on the inner side with respect to the bend direction of the bend pipe. Accordingly, it is possible to improve the efficiency of the fluid machine.

(15) In some embodiments, the above fluid machine (14) is a turbine, an axial flow compressor, or a centrifugal compressor.

With the above fluid machine (15), the bend pipe described in any one of the above (1) to (13) is provided, and thus it is possible to suppress development or occurrence of separation in a region on the inner side with respect to the bend direction of the bend pipe. Accordingly, it is possible to improve the turbine efficiency and the compressor efficiency.

Advantageous Effects

According to at least one embodiment of the present invention, provided is a bend pipe and a fluid machine including the same, whereby it is possible to suppress occurrence of separation in a region on the inner side in the bend direction.

BRIEF DESCRIPTION OF DRAWINGS

FIG. 26 is a diagram for describing the problem of a typical art.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

On the other hand, an expression such as "comprise", "include", "have", "contain" and "constitute" are not intended to be exclusive of other components.

Figure 1:
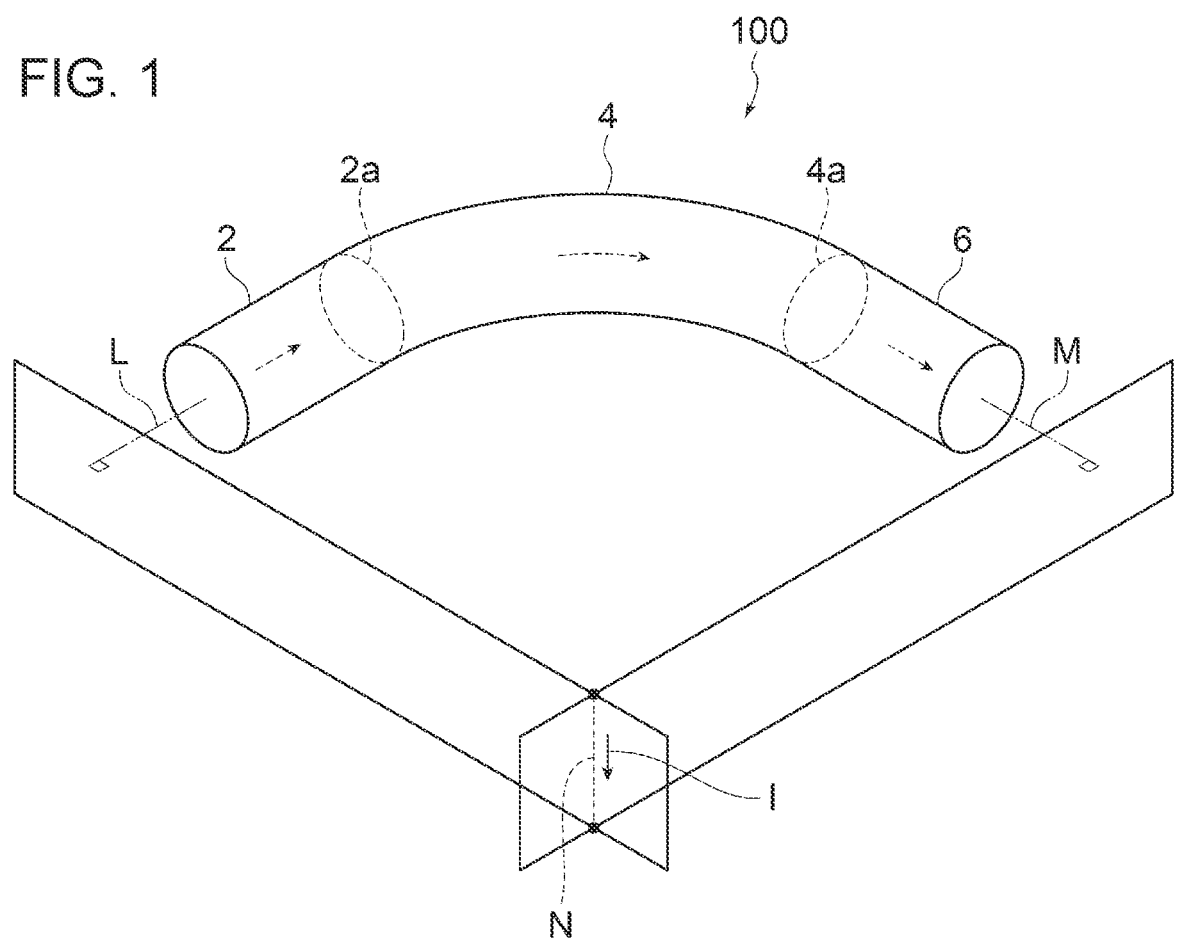
FIG. 1 is a schematic perspective view of a bend pipe 100 according to an embodiment.

FIG. 1 is a schematic perspective view of a bend pipe 100 according to an embodiment. The bend pipe 100 is a bend pipe for supplying a fluid to a fluid machine described below or discharging the fluid from the fluid machine. The fluid flowing through the bend pipe 100 is an energy medium used in energy conversion in a fluid machine, which is, for instance a high-pressure gas or a high-pressure fluid.

As shown in FIG. 1, the bend pipe 100 includes an inlet pipe portion 2 having a linear shape, a bend pipe portion 4 connected to a downstream end 2a of the inlet pipe portion 2 and configured to change the flow direction of the fluid, and an outlet pipe portion 6 having a linear shape connected to a downstream end 4a of the bend pipe portion 4.

Herein, as shown in FIG. 1, line L refers to the line including the pipe axial center line of the inlet pipe portion 2 and the extension line thereof, line M refers to the line including the pipe axial center line of the outlet pipe portion 6 and the extension line thereof, and direction I refers to the direction parallel to an intersection line N formed by a plane orthogonal to the line L and a plane orthogonal to the line M. If the line L and the line M are on the same plane, the direction I is the direction orthogonal to the plane including both of the line L and the line M.

Figure 2:
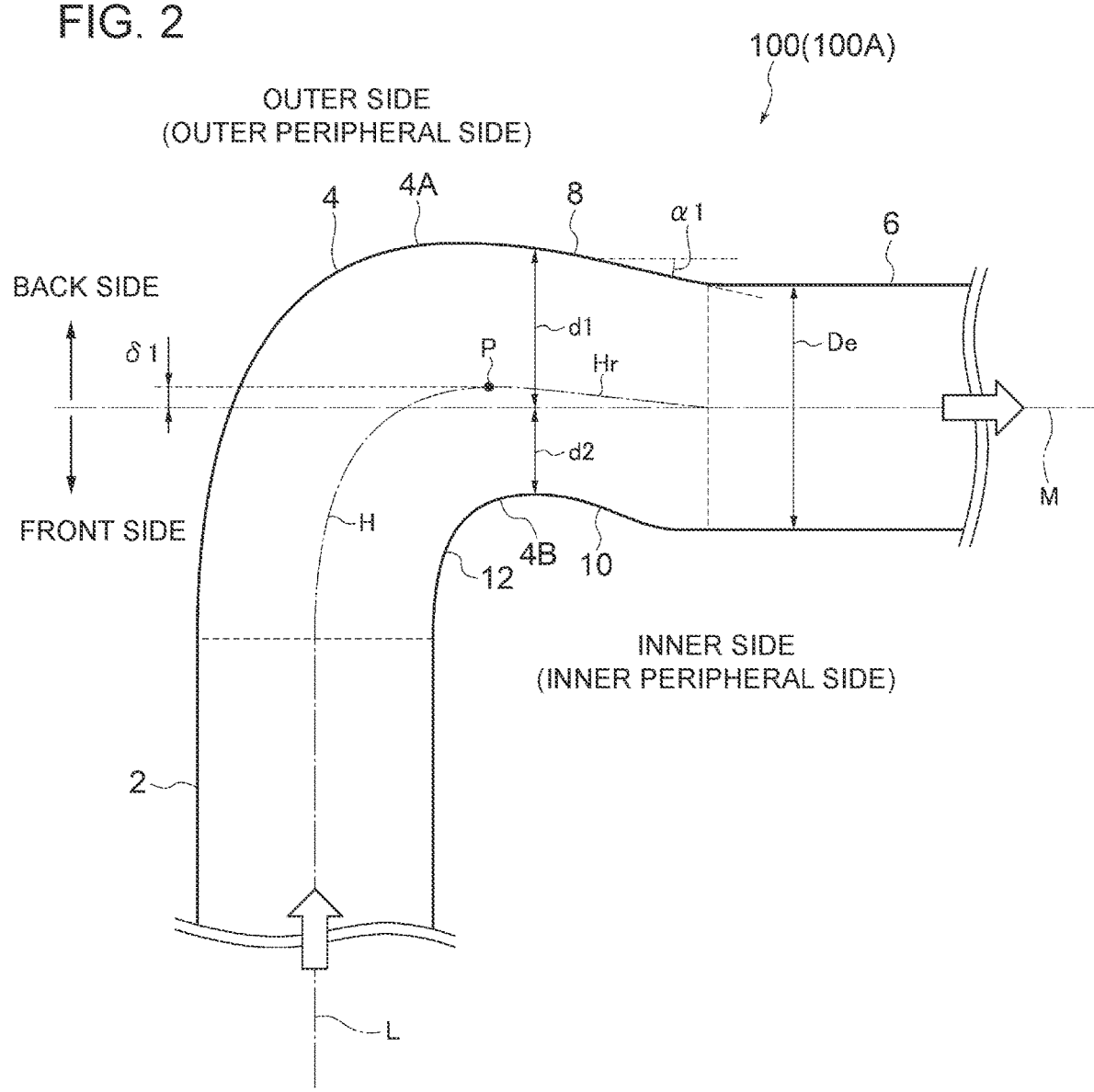
FIG. 2 is a schematic diagram showing an example of the shape of a bend pipe 100 (100A) according to an embodiment, as seen from a direction I.
Figure 3:
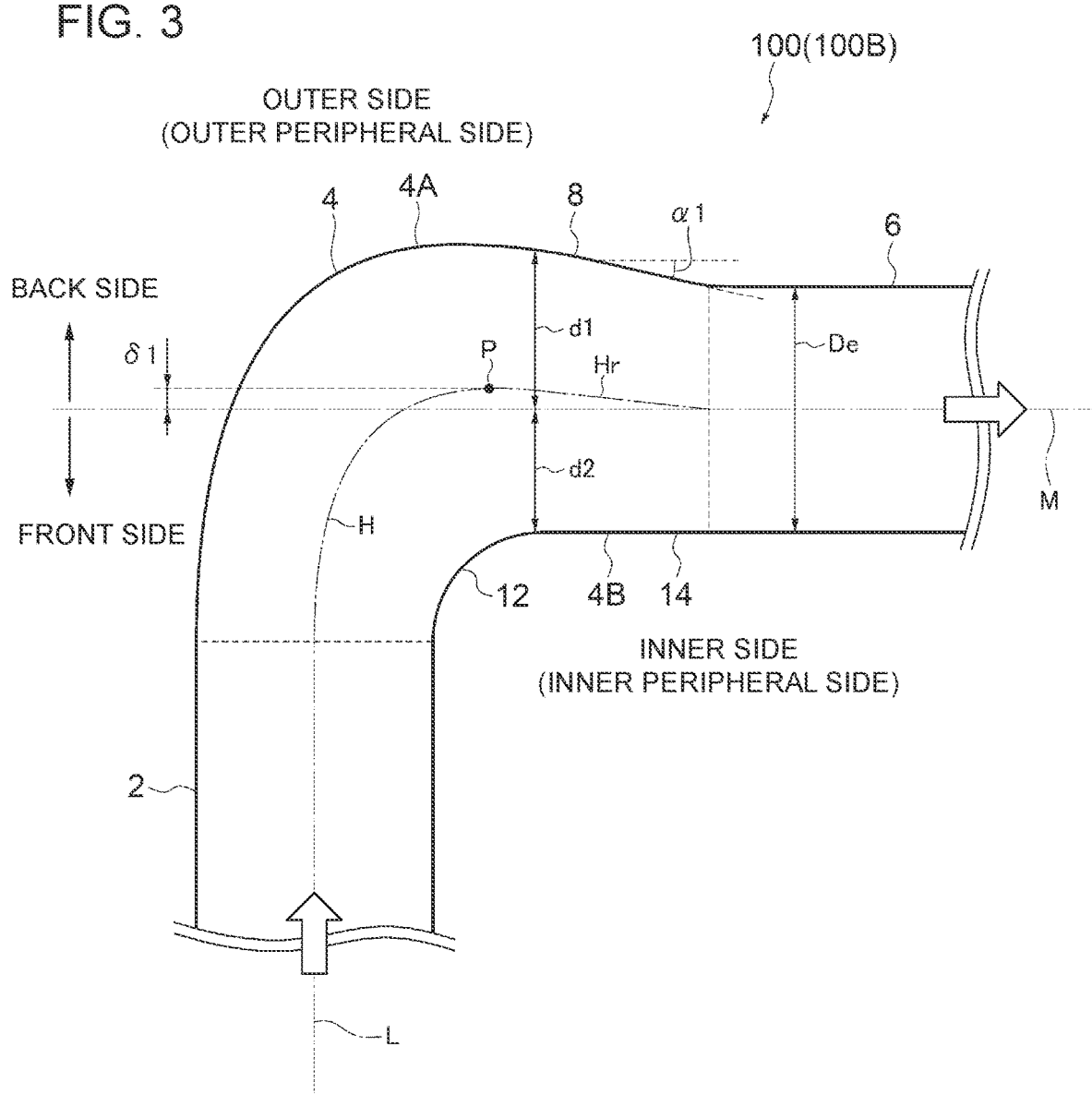
FIG. 3 is a schematic diagram showing an example of the shape of a bend pipe 100 as seen from the direction I.
Figure 4:
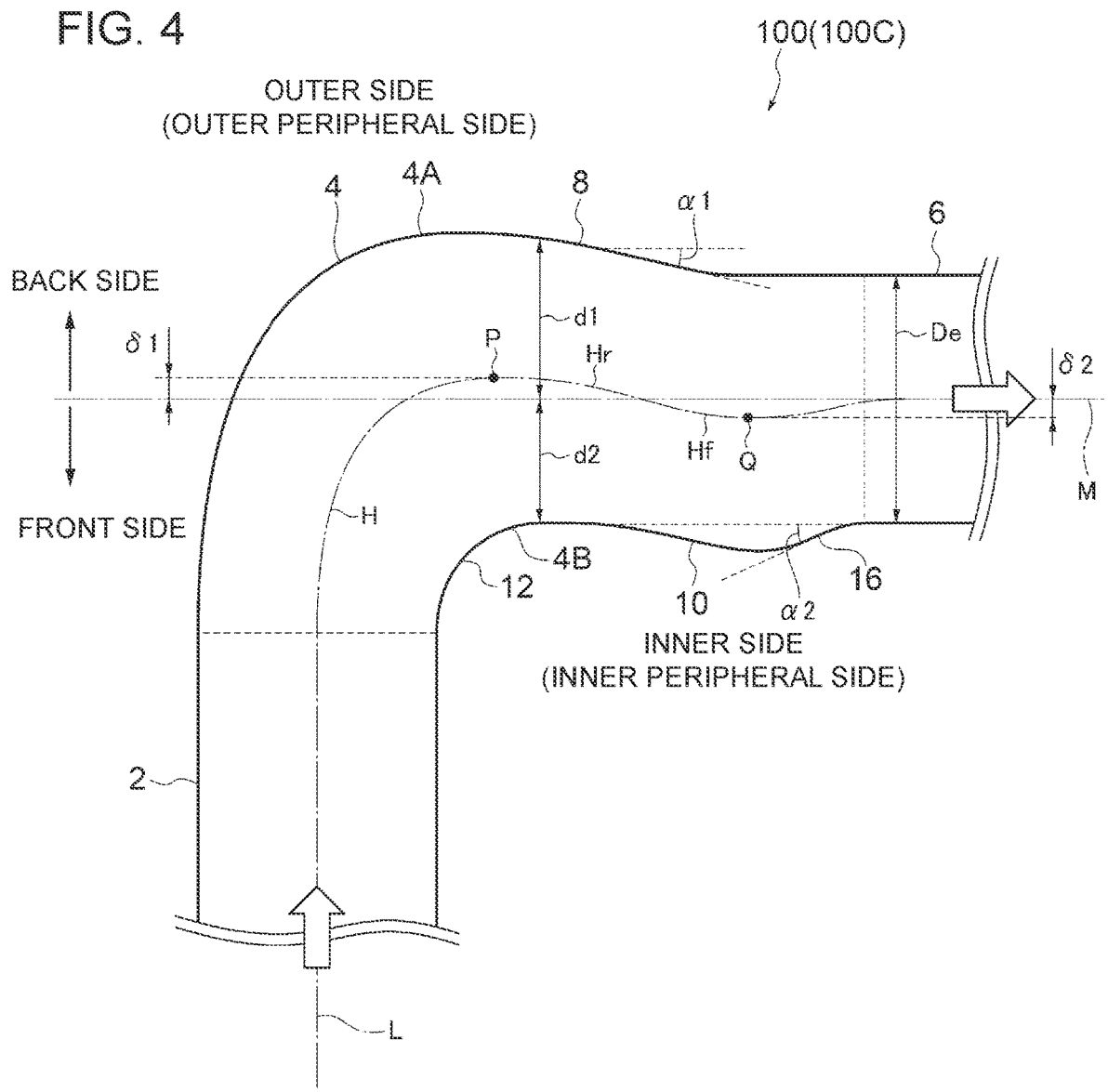
FIG. 4 is a schematic diagram showing an example of the shape of a bend pipe 100 as seen from the direction I.

FIG. 2 is a schematic diagram showing the shape of a bend pipe 100 (100A) according to an embodiment, as seen from the direction I. FIG. 3 is a schematic diagram showing the shape of a bend pipe 100 (100B) according to an embodiment, as seen from the direction I. FIG. 4 is a schematic diagram showing the shape of a bend pipe 100 (100C) according to an embodiment, as seen from the direction I.

In some embodiments, in a view of the bend pipe 100 seen from the direction I as shown in FIGS. 2 to 4, provided that the front side refers to a side of the line M including the inlet pipe portion 2 and the back side refers to the other side of the line M not including the inlet pipe portion 2, the side surface 4A of the outer side in the bend direction (the outer side with respect to the curvature radius) of the bend pipe portion 4 includes an outer inclined surface 8 inclined so that the distance d1 from the line M decreases toward the downstream side, on the back side of the line M.

Figure 5:
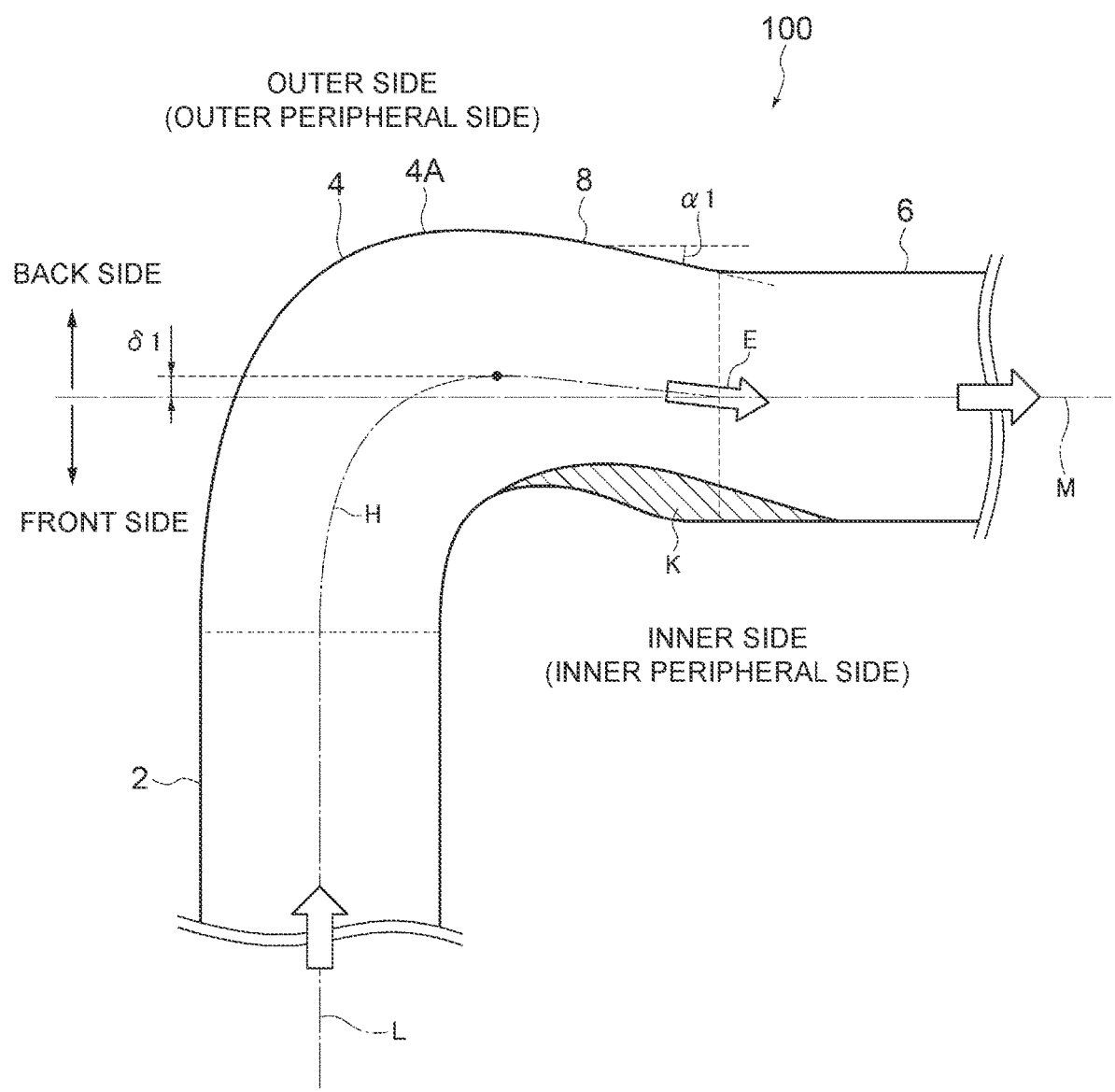
FIG. 5 is a diagram for describing an effect to suppress development or occurrence of a separation flow.

With this configuration, as shown in FIG. 5, the direction E of a flow after passing the bend pipe portion 4 is inclined from the line M so as to move inward in the bend direction of the bend pipe 100 toward the downstream side. As a result, with the flow moving in the direction E, it is possible to suppress development of a separation flow that occurs in the region on the inner side of the bend direction of the bend pipe 100 by quickly making a separation flow K re-adhere to the inner side, or to suppress occurrence itself of the separation flow K. While an effect to suppress a separation flow is described in FIG. 5 referring to the bend pipe shape shown in FIG. 2 as an example, the same effect can be achieved by the bend pipe shape shown in FIGS. 3 and 4 having the outer inclined surface 8.

In some embodiments, as shown in FIGS. 2 to 4, as seen from the direction I, the maximum value $\alpha 1$ of the inclination angle formed between the outer inclined surface 8 and the line parallel to the line M is not smaller than 10°. Accordingly, it is possible to increase the inclination of the direction E of the flow after passing the bend pipe portion 4 from the above described line M to some extent, and thus it is possible to suppress development or occurrence of a separation flow in the inner region with respect to the bend direction of the bend pipe 100 with a high effectiveness.

In some embodiments, as shown in FIGS. 2 to 4, the pipe axial center line H of the bend pipe portion 4 includes a back-side eccentric portion Hr offset from the line M toward the back side. Accordingly, it is possible to increase the inclination of the direction E of the flow after passing the bend pipe portion 4 from the above described line M more easily, and thus it is possible to suppress development or occurrence of a separation flow in the inner region with respect to the bend direction of the bend pipe 100.

In some embodiments, as shown in FIGS. 2 to 4, the distance $\delta 1$ between the line M and a position P on the back-side eccentric portion Hr farthest from the line M toward the back side and the diameter De of the outlet pipe portion 6 satisfy $\delta 24\ 0.1$ De. Accordingly, it is possible to increase the inclination of the direction E of the flow after passing the bend pipe portion 4 from the above described line M to some extent, and thus it is possible to suppress development or occurrence of a separation flow in the inner region with respect to the bend direction of the bend pipe 100 with a high effectiveness.

In an embodiment, as shown in FIGS. 2 and 4 for instance, the side surface 4B on the inner side with respect to the bend direction of the bend pipe portion 4 may include an inclined surface 12 whose distance d2 from the line M decreases toward the downstream side, and an inclined surface 10 disposed on the downstream side of the inclined surface 12, whose distance d2 from the line M increases toward the downstream side.

In an embodiment, as shown in FIG. 3 for instance, the side surface 4B on the inner side with respect to the bend direction of the bend pipe portion 4 may include an inclined surface 12 whose distance d2 from the line M decreases toward the downstream side, and a non-inclined surface 14 disposed on the downstream side of the inclined surface 12, whose distance d2 from the line M is constant regardless of the position in the flow direction.

Figure 6:
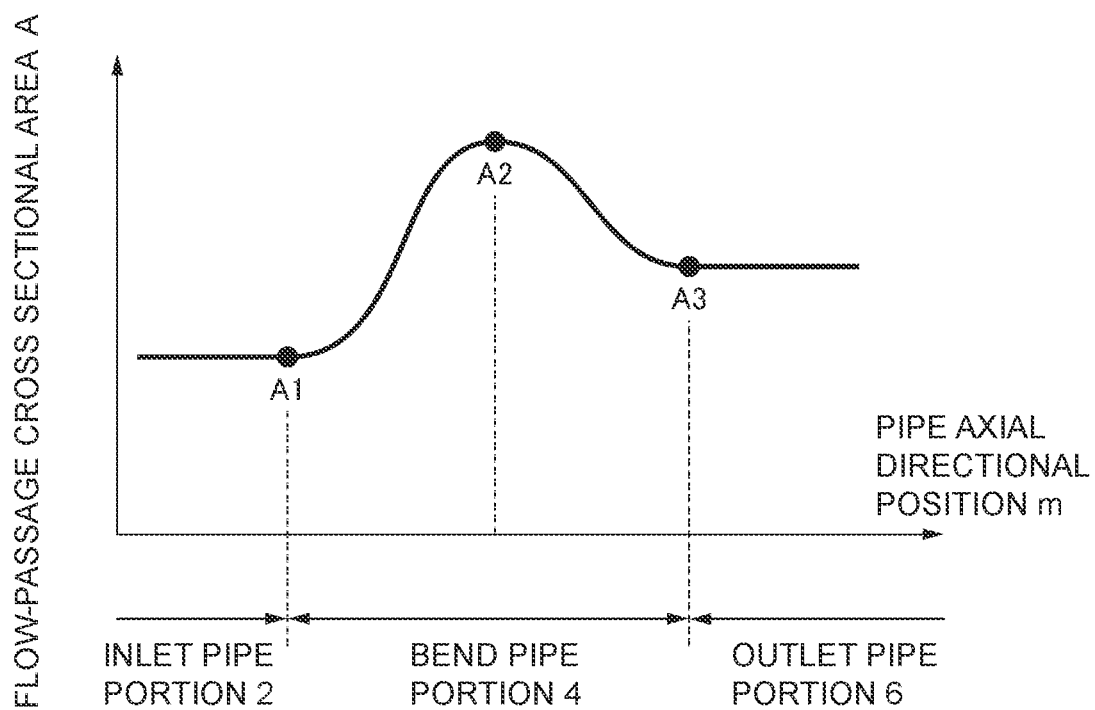
FIG. 6 is a diagram showing a relationship between a pipe axial directional position 'm' and a flow-passage cross-sectional area A of a bend pipe 100 shown in FIG. 3.

FIG. 6 is a diagram showing a relationship between a pipe axial directional position 'm' and a flow-passage cross-sectional area A of the bend pipe 100 shown in FIG. 3.

In an embodiment, as shown in FIG. 6, the flow-passage cross-sectional area in at least one section of the bend pipe portion 4 may be greater than each of the flow-passage cross-sectional area A1 of the inlet pipe portion 2 and the flow-passage cross-sectional area A3 of the outlet pipe portion 6.

The pressure loss of a fluid in a pipe passage increases in proportion to square of velocity of the fluid. Thus, for the bend pipe portion 4 where a particularly large pressure loss is likely to occur, it is desirable to increase the flow-passage cross-sectional area and reduce the flow velocity, to reduce pressure loss.

In this regard, as in the above, with the flow-passage cross-sectional area in at least one section of the bend pipe portion 4 being greater than each of the flow-passage cross-sectional area A1 of the inlet pipe portion 2 and the flow-passage cross-sectional area A3 of the outlet pipe portion 6, the flow velocity decreases and a centrifugal force applied to the fluid is reduced, at least in the above section of the bend pipe portion 4. Thus, it is possible to suppress separation on the inner side with respect to the bend direction of the bend pipe 100.

Figure 7:
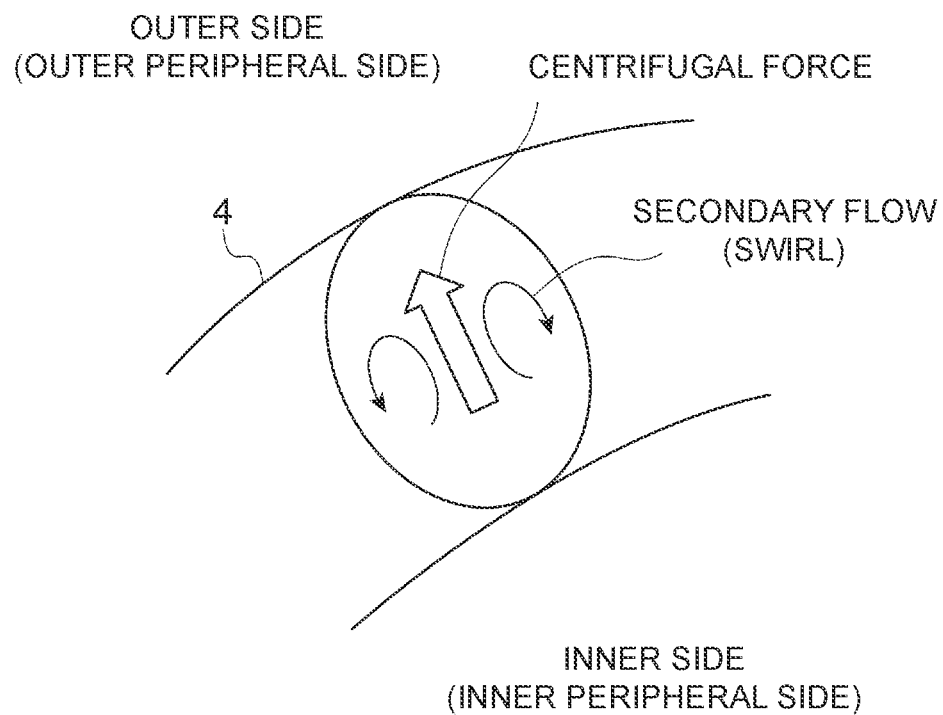
FIG. 7 is a schematic diagram for describing the secondary flow due to a centrifugal force.

Furthermore, as a result of a decrease in the centrifugal force at least in a section of the bend pipe portion 4, deflection of a flow toward the outer side in the bend direction is reduced for the outlet pipe portion 6, and occurrence of a secondary flow (see FIG. 7) due to the centrifugal force is also suppressed. As a result, it is possible to suppress rotation of a flow at the outlet pipe portion 6 and the downstream side thereof, and to make the flow uniform. Thus, it is possible to suppress deterioration of efficiency of a device disposed downstream of the bend pipe 100.

Furthermore, in a case where a flow originally having a rotation component enters from the inlet pipe portion 2, the flow-passage cross-sectional area is increased at the bend pipe portion 4, and thereby the rotation component is reduced, which makes it possible to make the flow uniform and reduce pressure loss.

Figure 8:
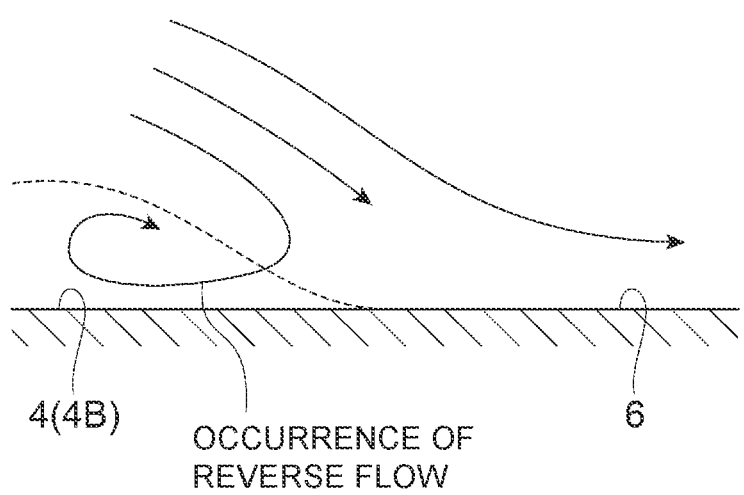
FIG. 8 is a diagram describing occurrence of a partial reverse flow, in a configuration without an inner inclined surface 16.

Meanwhile, as described above, in a case where the side surface 4A on the outer side in the bend direction of the bend pipe portion 4 has the outer inclined surface 8, the flow after passing through the bend pipe portion 4 is guided to the inner side in the bend direction, and thereby it is possible to suppress separation in the inner region. On the other hand, according to findings of the present inventors, as shown in FIG. 8, a part of the flow toward the inner side hits the side surface on the inner side, and the part of the flow may flow backward, provoking local separation on the upstream side.

Figure 9:
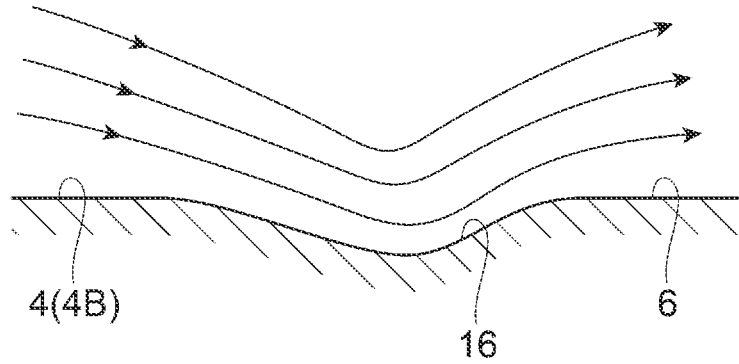
FIG. 9 is a diagram describing suppression of occurrence of a partial reverse flow, in a configuration with an inner inclined surface 16.

Thus, in an embodiment, as shown in FIG. 4 for instance, the side surface 4B on the inner side with respect to the bend direction of the bend pipe portion 4 may include an inner inclined surface 16 whose distance d2 from the line M decreases toward the downstream side, disposed downstream of the outer inclined surface 8. In the embodiment shown in the drawing, the inner inclined surface 16 is formed continuously on the downstream side of the inclined surface 10 described above. With the above configuration, as shown in FIG. 9, the flow from the bend pipe portion 4 to the outlet pipe portion 6 curves along the inner inclined surface 16, and it is possible to suppress a partial reverse flow and local separation as described above.

In an embodiment, in FIG. 4, the maximum value $\alpha 1$ of the inclination angle formed by the outer inclined surface 8 with a line parallel to the line M and the maximum value $\alpha 2$ of the inclination angle formed by the inner inclined surface 16 with a line parallel to the line M may satisfy $\alpha 1 \geq \alpha 2$. Accordingly, it is possible to suppress separation effectively over a broad range on the inner side with respect to the bend direction of the bend pipe 100.

In an embodiment, as shown in FIG. 4, the pipe axial center line H of the bend pipe portion 4 includes a front-side eccentric portion Hf offset from the line M toward the front side, on the downstream side of the back-side eccentric portion Hr. Accordingly, as shown in FIG. 9, the flow from the bend pipe portion 4 to the outlet pipe portion 6 curves along the inner inclined surface, and it is possible to suppress a partial reverse flow and local separation as described above.

In an embodiment, as shown in FIG. 4, the distance $\delta 1$ between the line M and a position P on the back-side eccentric portion Hr farthest from the line M toward the back side and the distance $\delta 2$ between the line M and a position Q on the front-side eccentric portion Hf farthest from the line M toward the front side may satisfy $\delta \geq \delta 2$. Accordingly, it is possible to suppress separation effectively over a broad range on the inner side with respect to the bend direction of the bend pipe 100.

Figure 10:
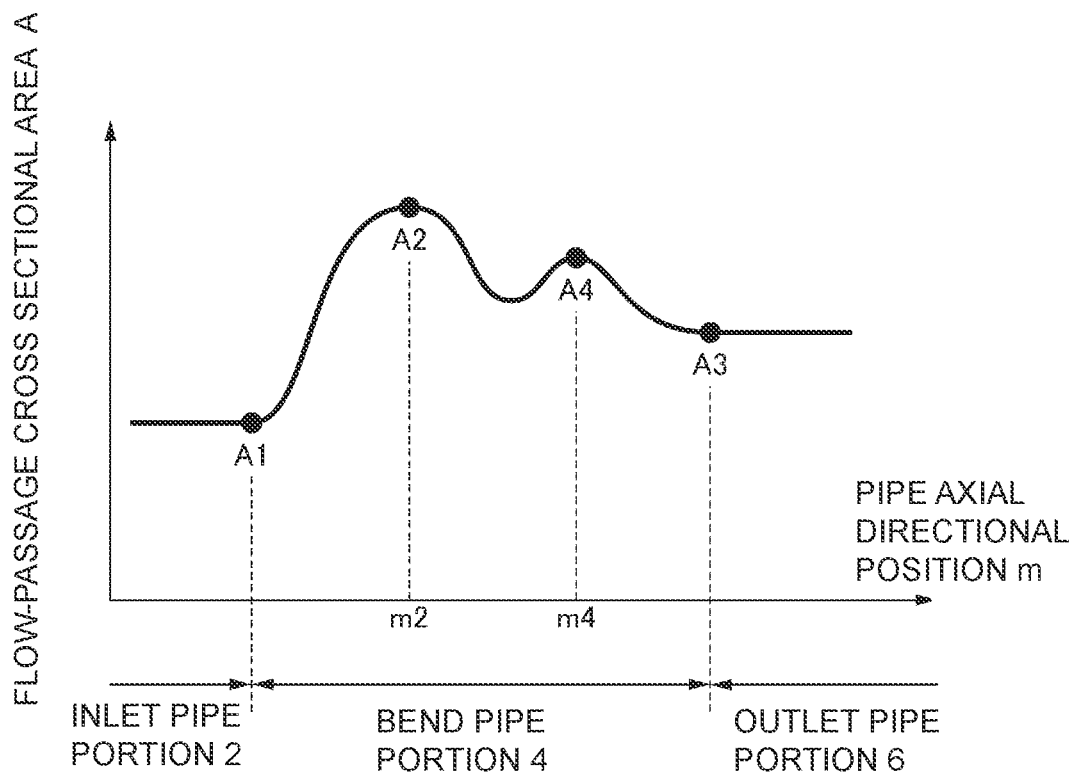
FIG. 10 is a diagram showing a relationship between a pipe axial directional position 'm' and a flow-passage cross-sectional area A of a bend pipe 100 shown in FIG. 4.

FIG. 10 is a diagram showing a relationship between a pipe axial directional position 'm' and a flow-passage cross-sectional area A of the bend pipe 100 shown in FIG. 4.

Also in the embodiment shown in FIG. 10, the flow-passage cross-sectional area in at least one section of the bend pipe portion 4 is greater than each of the flow-passage cross-sectional area A1 of the inlet pipe portion 2 and the flow-passage cross-sectional area A3 of the outlet pipe portion 6. Furthermore, in the embodiment shown in FIG. 10, the flow-passage cross-sectional area of the bend pipe portion 4 reaches the local maximum value A4 at the pipe axial directional position 'm4' on the downstream side of the pipe axial directional position 'm2' at which the flow-passage cross-sectional area of the bend pipe portion 4 reaches its maximum value A2. With the above configuration, it is possible to suppress separation over a broad range on the inner side with respect to the bend direction of the bend pipe 100, and reduce pressure loss.

Figure 11:
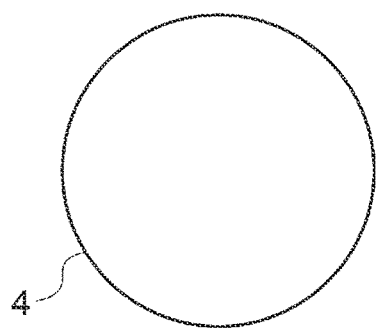
FIG. 11 is a diagram showing an example of a flow-passage cross-sectional shape of a bend pipe portion 4 shown in FIGS. 2 to 4.
Figure 12:
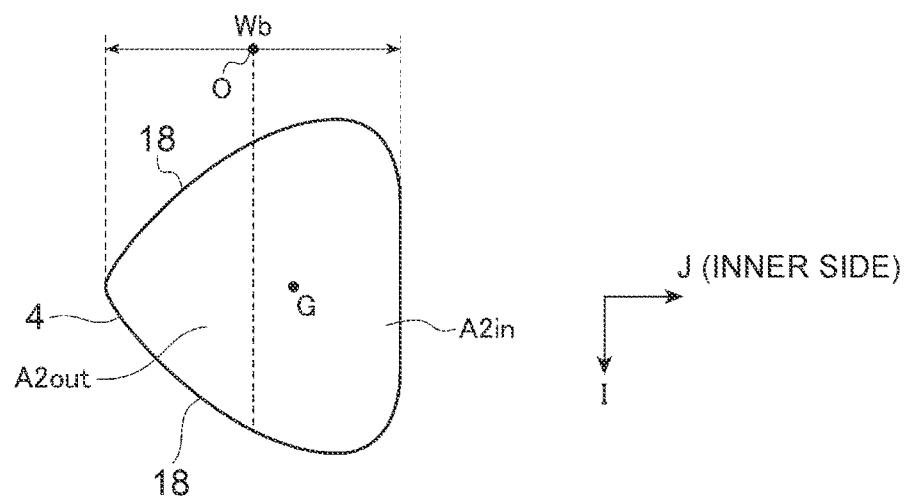
FIG. 12 is a diagram showing an example of a flow-passage cross-sectional shape of the bend pipe portion 4 shown in FIGS. 2 to 4.
Figure 13:
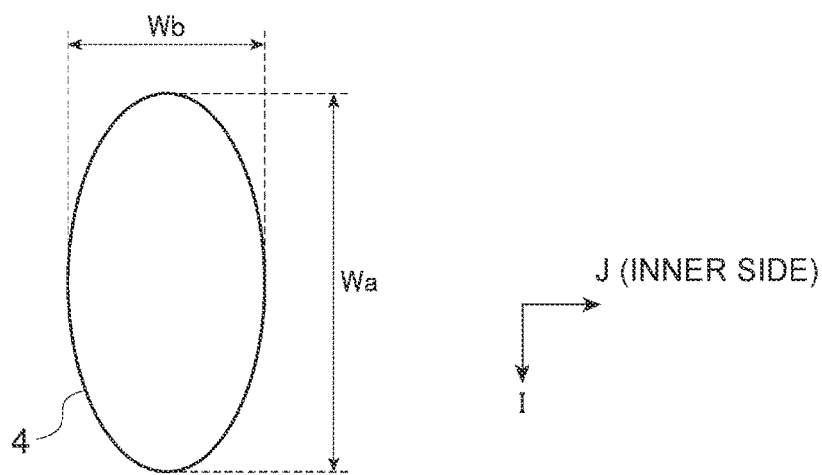
FIG. 13 is a diagram showing an example of a flow-passage cross-sectional shape of the bend pipe portion 4 shown in FIGS. 2 to 4.
Figure 14:
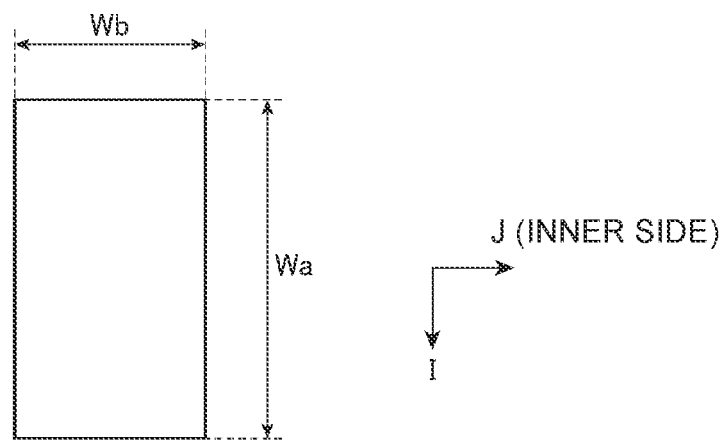
FIG. 14 is a diagram showing an example of a flow-passage cross-sectional shape of the bend pipe portion 4 shown in FIGS. 2 to 4.
Figure 15:
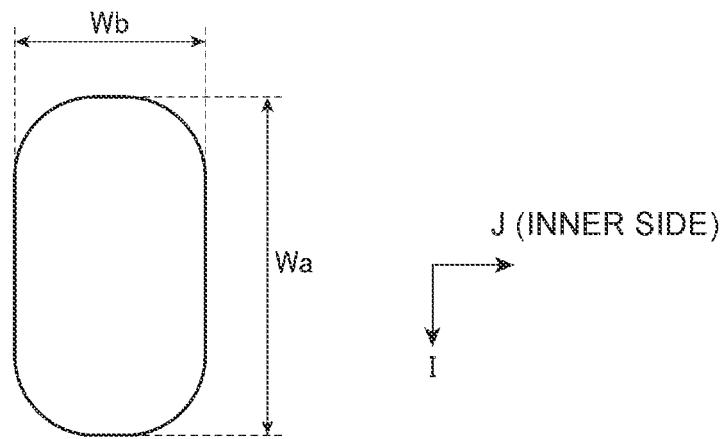
FIG. 15 is a diagram showing an example of a flow-passage cross-sectional shape of the bend pipe portion 4 shown in FIGS. 2 to 4.

FIG. 11 is a diagram showing an example of a flow-passage cross-sectional shape of the bend pipe portion 4 shown in FIGS. 2 to 4. FIG. 12 is a diagram showing an example of a flow-passage cross-sectional shape of the bend pipe portion 4 shown in FIGS. 2 to 4. FIG. 13 is a diagram showing an example of a flow-passage cross-sectional shape of the bend pipe portion 4 shown in FIGS. 2 to 4. FIG. 14 is a diagram showing an example of a flow-passage cross-sectional shape of the bend pipe portion 4 shown in FIGS. 2 to 4. FIG. 15 is a diagram showing an example of a flow-passage cross-sectional shape of the bend pipe portion 4 shown in FIGS. 2 to 4.

In an embodiment, as shown in FIG. 11, the flow-passage cross section of the bend pipe portion 4 may have a circular shape.

In an embodiment, as shown in FIG. 12, the bend pipe portion 4 may include a cross section in which the gravity center G is positioned on the inner side, with respect to the bend direction, of the center O of the flow-passage width Wb in the direction J orthogonal to the direction I, at least in a partial section. That is, in the cross section of at least a partial section of the bend pipe portion 4, the flow-passage cross-sectional area A2out on the outer side, with respect to the bend direction, of the center O of the flow-passage width Wb may be smaller than the flow-passage cross-sectional area A2in on the inner side, with respect to the bend direction, of the center O.

Generally, in the bend pipe portion, the flow is likely to deflect outward with respect to the bend direction, which may cause pressure loss. In view of this, with the bend pipe portion 4 including a cross section in which the gravity center G is positioned on the inner side, with respect to the bend direction, of the center O of the flow-passage width Wb as described above, the fluid is less likely to flow into a region on the outer side, with respect to the bend direction, of the center O of the bend pipe portion 4, while the fluid is more likely to flow into a region on the inner side, with respect to the bend direction, of the center O. As a result, separation is reduced, and it is possible to reduce pressure loss in the bend pipe portion 4. Furthermore, the flow amount decreases in the region on the outer side, with respect to the bend direction, where a centrifugal force has a strong influence, and development of the secondary flow (see FIG. 7) is suppressed by inclination of the wall surface 18.

In some embodiments, as shown in FIGS. 13 to 15, the bend pipe portion 4 may have a flattened shape in which the flow-passage width Wb in the direction J orthogonal to the direction I is smaller than the flow-passage width Wa in the direction I, at least in a partial section. The flattened shape may be an oval shape as shown in FIG. 13A, or a rectangular shape as shown in FIG. 14, or a rectangular with rounded corners as shown in FIG. 15. Furthermore, although not shown in the drawings, the flattened shape is not particularly limited, and may be a polygonal shape such as a diamond shape and a trapezoidal shape, or one of these shapes with rounded corners.

With the above configuration, the flow-passage width Wb in the direction J is smaller than the flow-passage width Wa in the direction I, and thereby it is possible to reduce the influence of a centrifugal force. Accordingly, it is possible to suppress a drift to a region on the outer side with respect to the bend direction, and to suppress occurrence of a secondary flow.

Figure 16:
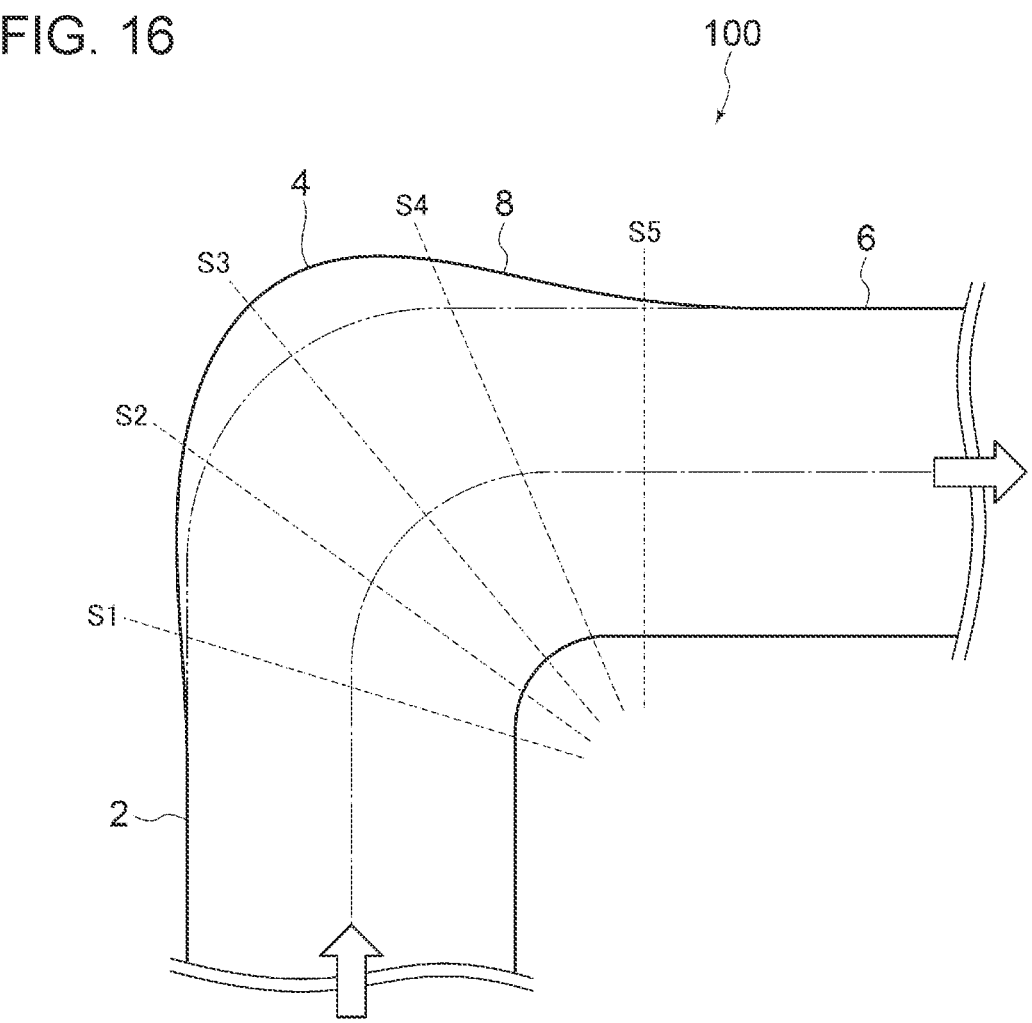
FIG. 16 is a diagram showing the shape of a bend pipe 100 according to an embodiment, as seen from the direction I.
Figures 17A, 17B, 17C:
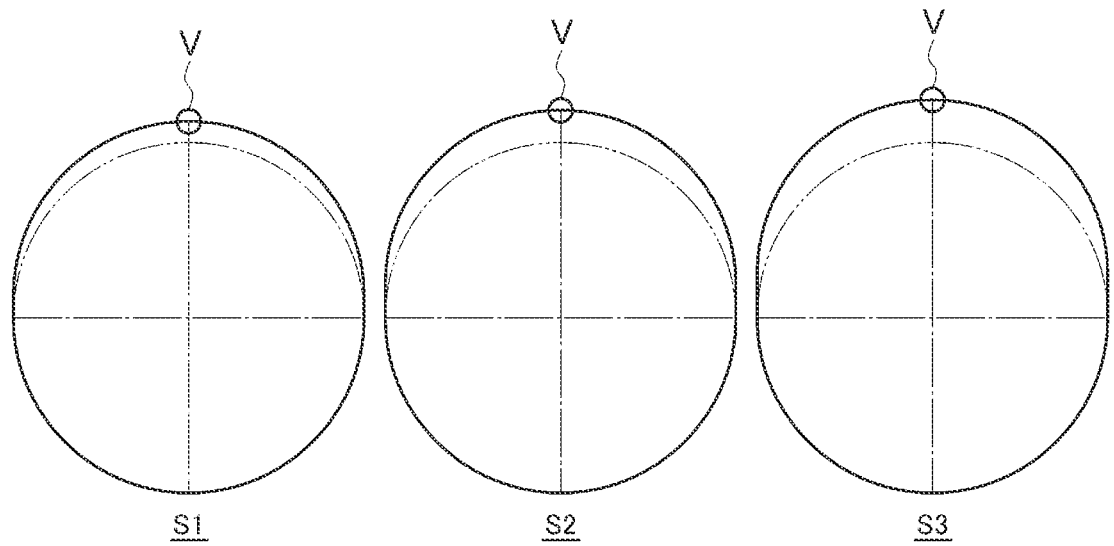
FIGS. 17A-17E are diagrams showing an example of cross sections S1 to S5 of a bend pipe portion 4 at a plurality of positions (pipe axial directional positions) in the flow direction shown in FIG. 16.
Figures 17D, 17E:
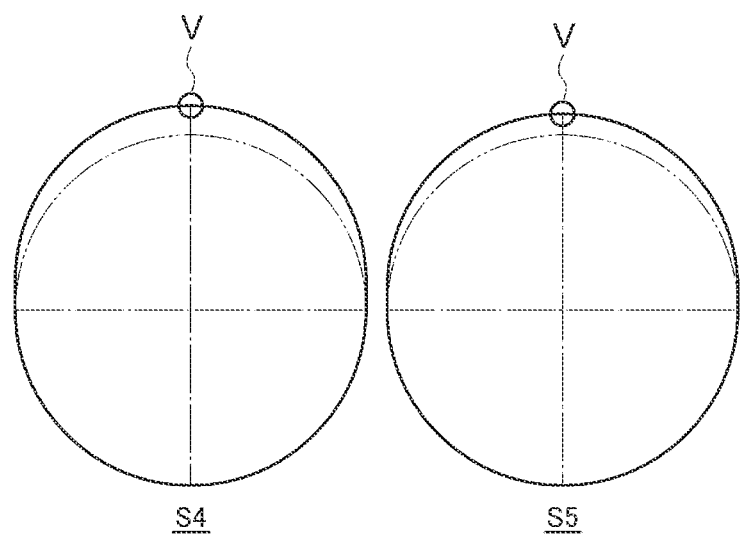
Figure 18A:
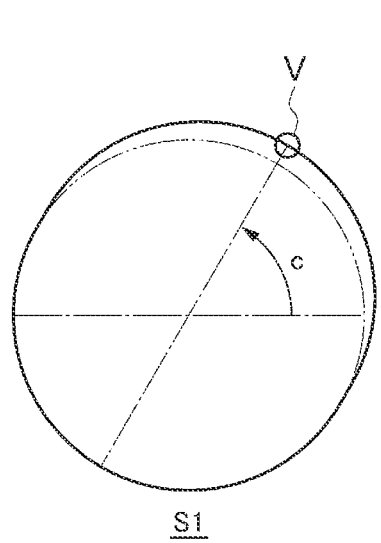
FIGS. 18A-18E are diagrams showing an example of cross sections S1 to S5 of a bend pipe portion 4 at a plurality of positions (pipe axial directional positions) in the flow direction shown in FIG. 16.
Figure 18B:
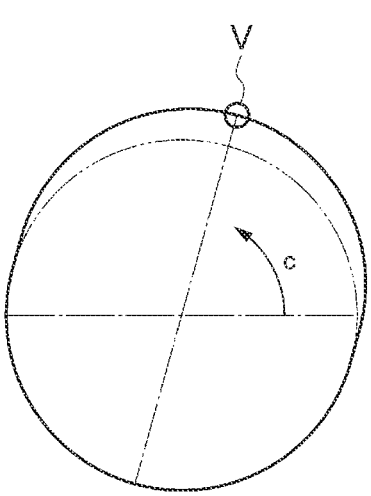
Figure 18C:
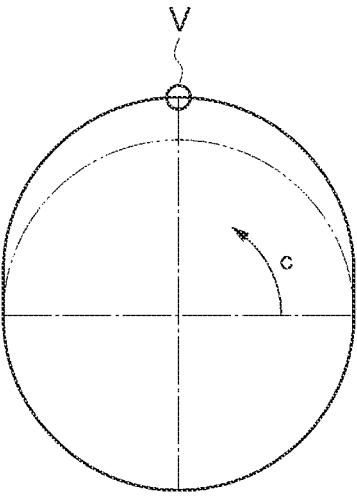
Figure 18D:
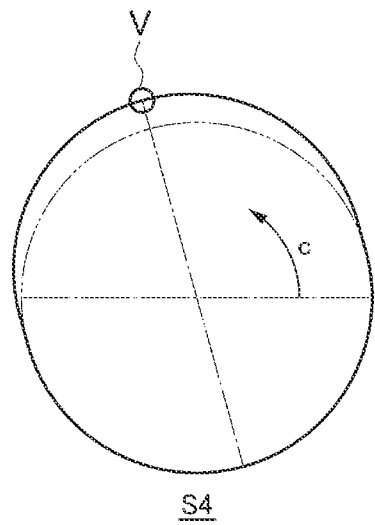
Figure 18E:
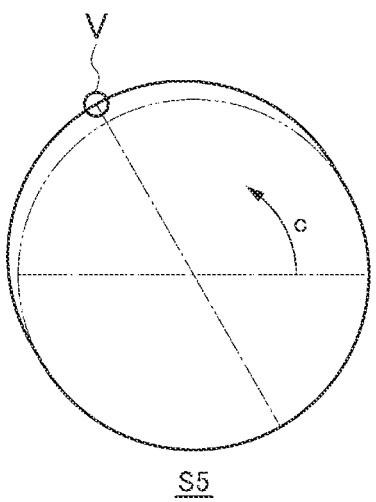

FIG. 16 is a schematic diagram showing the shape of a bend pipe 100 according to an embodiment, as seen from the direction I. FIGS. 17A-17B are diagrams showing an example of cross sections S1 to S5 of the bend pipe portion 4 at a plurality of positions (pipe axial directional positions) in the flow direction shown in FIG. 16. FIGS. 18A-18E are diagrams showing an example of cross sections S1 to S5 of the bend pipe portion 4 at a plurality of positions (pipe axial directional positions) in the flow direction shown in FIG. 16. In FIGS. 17A-17E and 18A-18E the cross sections S1 to S5 are cross sections as seen from the downstream side in the flow direction.

In an embodiment, as shown in FIGS. 17A-17E, the vertex position V at which the flow-passage width reaches its maximum in each of the cross sections S1 to S5 of the bend pipe portion 4 may be constant regardless of the position in the flow direction. Accordingly, it is possible to form the above described outer inclined surface 8 with a simple shape.

Figure 19A:
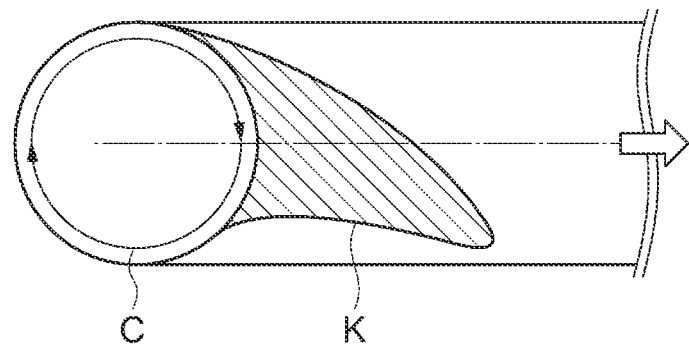
FIG. 19A is a front view showing a region of occurrence of a separation flow K in a bend pipe 100, as seen from the upstream side of the bend pipe 100.
Figure 19B:
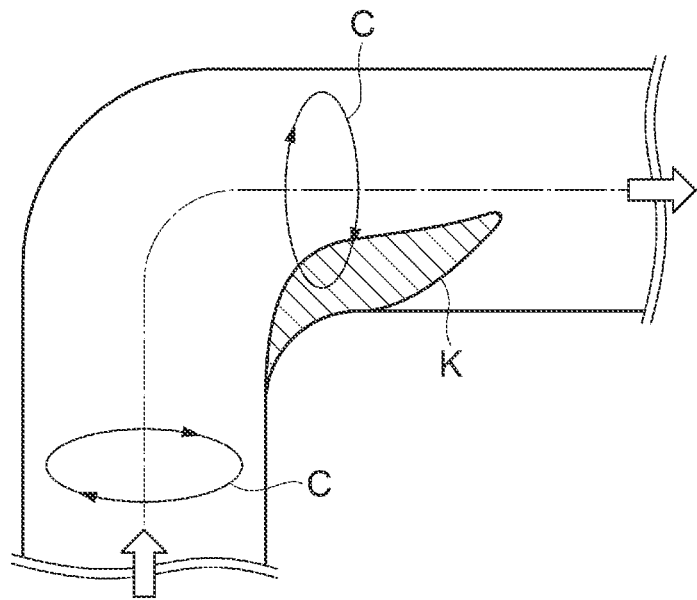
FIG. 19B is a top view showing a region of occurrence of a separation flow K in a bend pipe 100, as seen from the direction I.
Figure 19C:
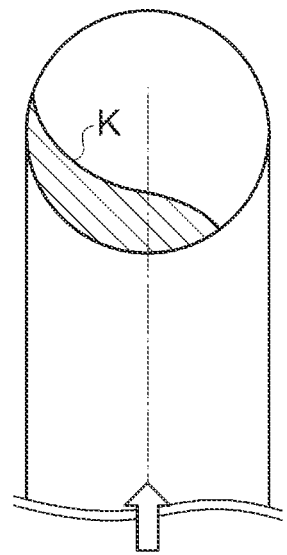
FIG. 19C is a side view showing a region of occurrence of a separation flow K in a bend pipe 100, as seen from the downstream side of the bend pipe 100.

Meanwhile, in a case where a flow that flows from the inlet pipe portion 2 originally has a rotation component, as shown in FIGS. 19A to 19C, the separation flow K generated on the inner side in the bend direction of the bend pipe 100 follows a twisted trajectory along the rotational direction C of the flow.

In this case, as shown in FIGS. 18A-18E, at least in a partial section of the bend pipe portion 4, the vertex position V at which the flow-passage width in each cross section of the bend pipe portion 4 reaches its maximum may shift along the rotational direction C of the flow about the axis toward the downstream side. Accordingly, even in a case where a flow that flows from the inlet pipe portion 2 originally has a rotation component, it is possible to suppress occurrence of separation effectively in a region on the inner side with respect to the bend direction of the bend pipe 100.

Figure 20:
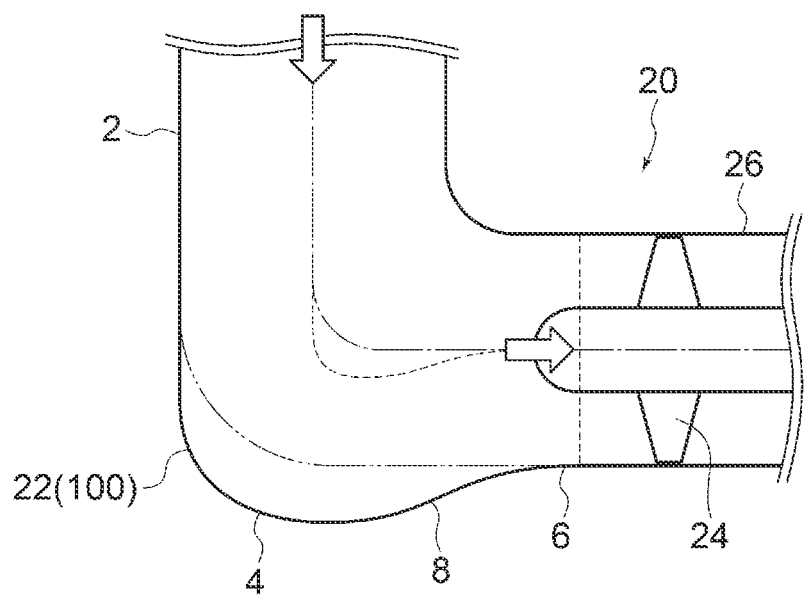
FIG. 20 is a schematic configuration diagram of a turbine 20 according to an embodiment.

Furthermore, as shown in FIG. 20, the bend pipe 100 described above may be applied to an inlet pipe 22 (intake chamber) of a turbine 20 as a fluid machine. That is, as shown in FIG. 20, in the turbine 20 including an impeller wheel 24, a turbine casing 26 covering the impeller wheel 24, and an inlet pipe 22 connected to the upstream side of the turbine casing 26 for guiding a fluid to the impeller wheel 24, the inlet pipe 22 may be the bend pipe 100.

Figure 21:
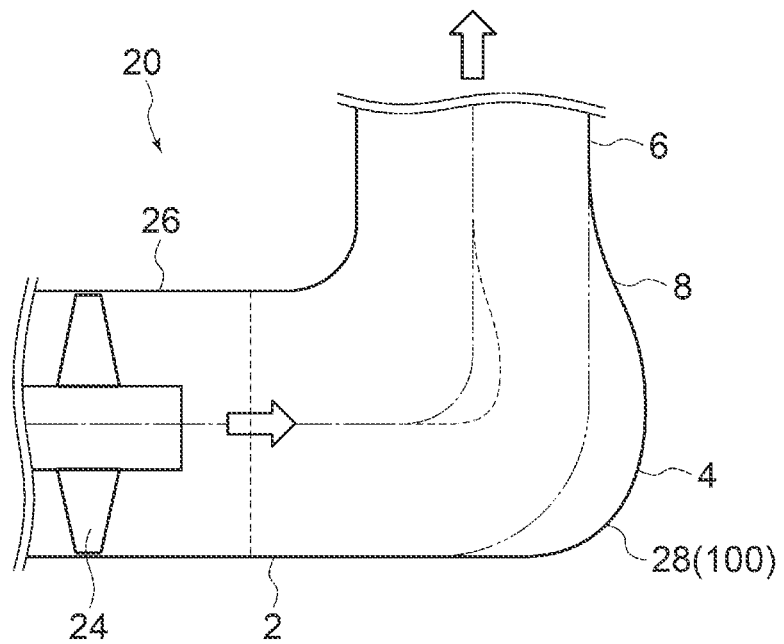
FIG. 21 is a schematic configuration diagram of a turbine 20 according to an embodiment.

Furthermore, as shown in FIG. 21, the bend pipe 100 described above may be applied to an outlet pipe 28 (exhaust chamber) of a turbine 20 as a fluid machine. That is, as shown in FIG. 21, in the turbine 20 including an impeller wheel 24, a turbine casing 26 covering the impeller wheel 24, and an outlet pipe 28 connected to the downstream side of the turbine casing 26 for discharging a fluid after passing through the impeller wheel 24, the outlet pipe 28 may be the bend pipe 100.

Figure 22:
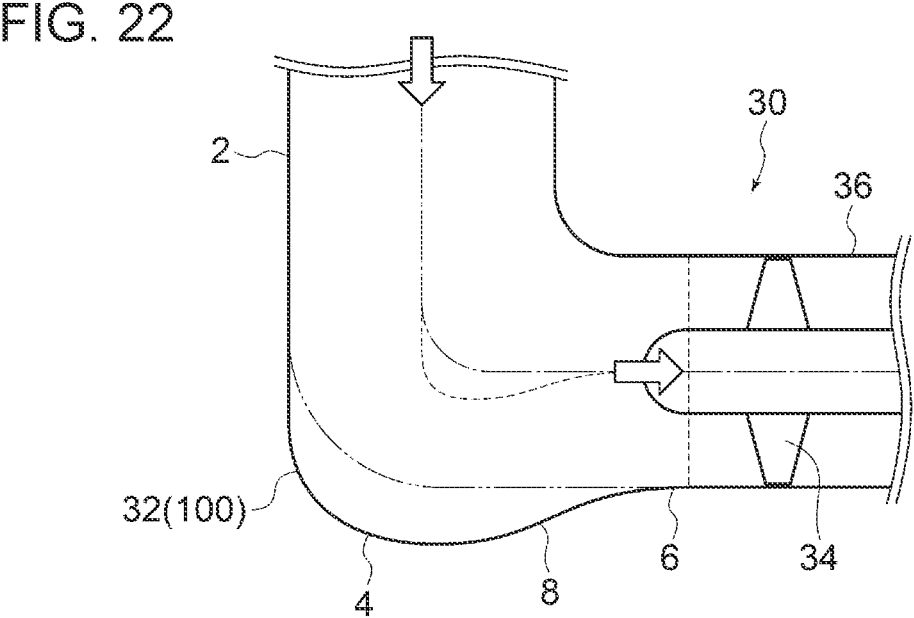
FIG. 22 is a schematic configuration diagram of an axial flow compressor 30 according to an embodiment.

Furthermore, as shown in FIG. 22, the bend pipe 100 described above may be applied to an inlet pipe 32 (intake chamber) of an axial flow compressor 30 serving as a fluid machine. That is, as shown in FIG. 22, in the axial flow compressor 30 including an impeller wheel 34, a compressor casing 36 covering the impeller wheel 34, and an inlet pipe 32 connected to the upstream side of the compressor casing 36 for guiding a fluid to the impeller wheel 34, the inlet pipe 32 may be the bend pipe 100.

Figure 23:
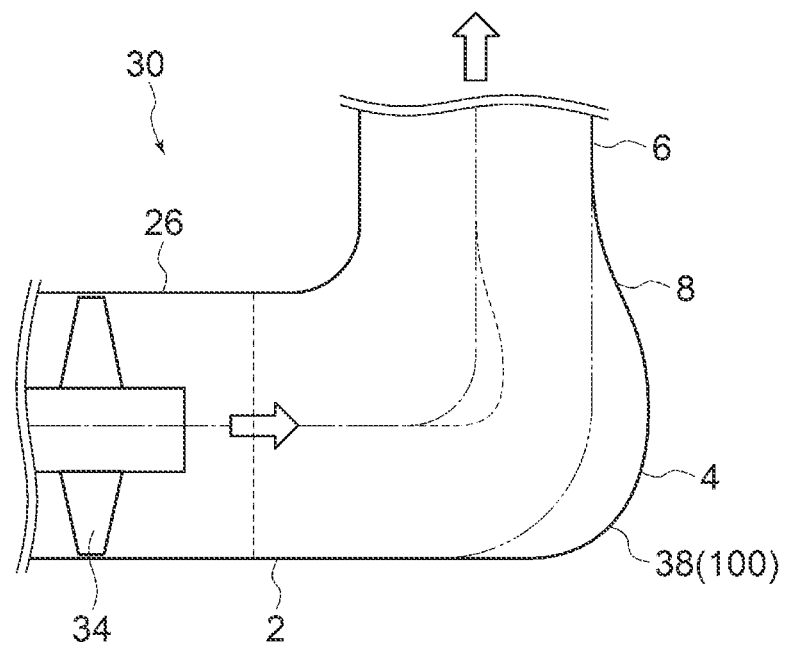
FIG. 23 is a schematic configuration diagram of an axial flow compressor 30 according to an embodiment.

Furthermore, as shown in FIG. 23, the bend pipe 100 described above may be applied to an outlet pipe 38 (exhaust chamber) of an axial flow compressor 30 serving as a fluid machine. That is, as shown in FIG. 23, in the axial flow compressor 30 including an impeller wheel 34, a compressor casing 36 covering the impeller wheel 34, and an outlet pipe 38 connected to the downstream side of the compressor casing 36 for discharging a fluid after passing through the impeller wheel 34, the outlet pipe 38 may be the bend pipe 100.

Figure 24:
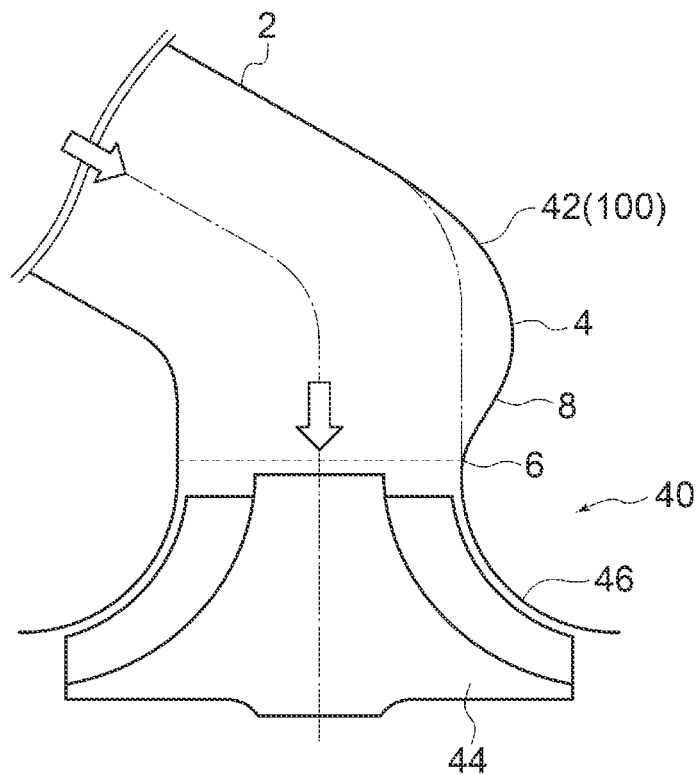
FIG. 24 is a schematic configuration diagram of a centrifugal compressor 40 according to an embodiment.

Furthermore, as shown in FIG. 24, the bend pipe 100 described above may be applied to an inlet pipe 42 of a centrifugal compressor 40 serving as a fluid machine. That is, as shown in FIG. 24, in the centrifugal compressor 40 including an impeller wheel 44, a compressor casing 46 covering the impeller wheel 44, and an inlet pipe 42 connected to the upstream side of the compressor casing 46 for guiding a fluid to the impeller wheel 44, the inlet pipe 42 may be the bend pipe 100.

Figure 25:
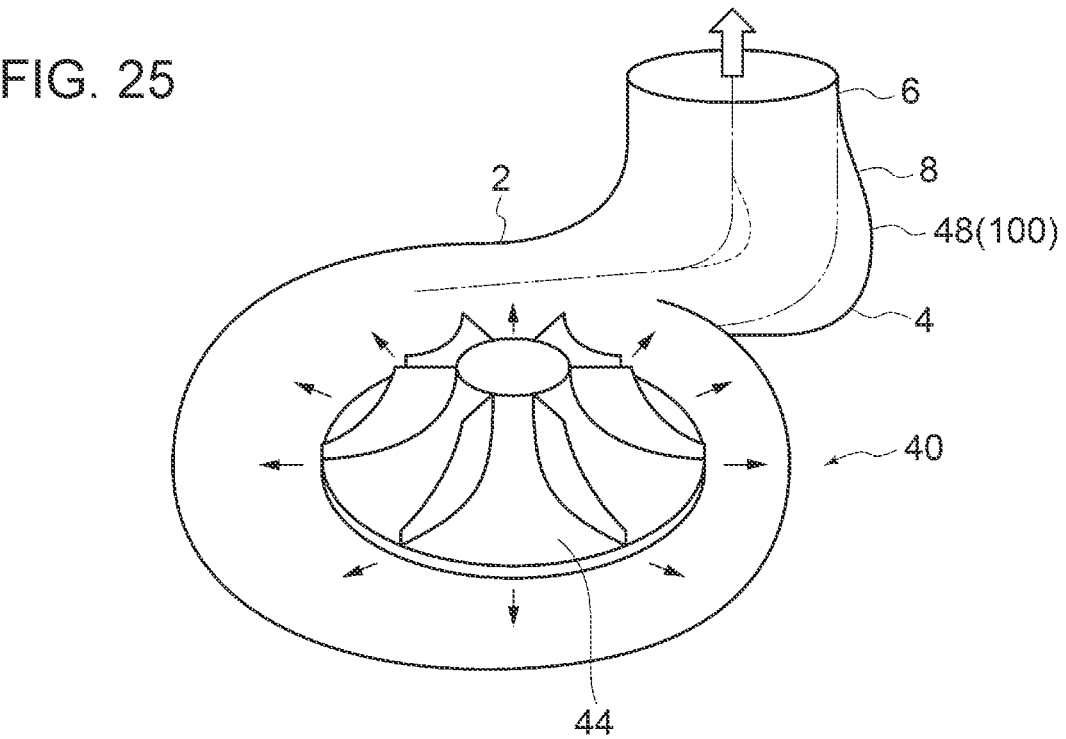
FIG. 25 is a schematic configuration diagram of a centrifugal compressor 40 according to an embodiment.
Figure 27A:
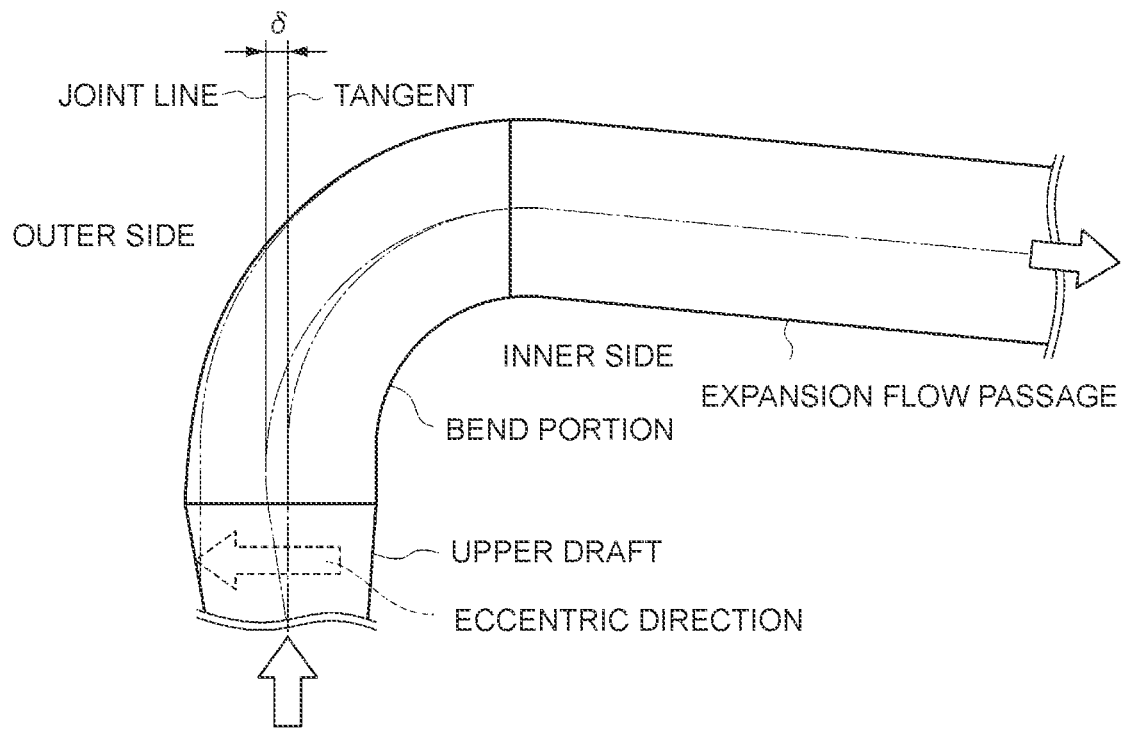
FIG. 27A is a diagram for describing the eccentric direction of a joint line between an upper portion draft and a bend portion in a typical art.
Figure 27B:
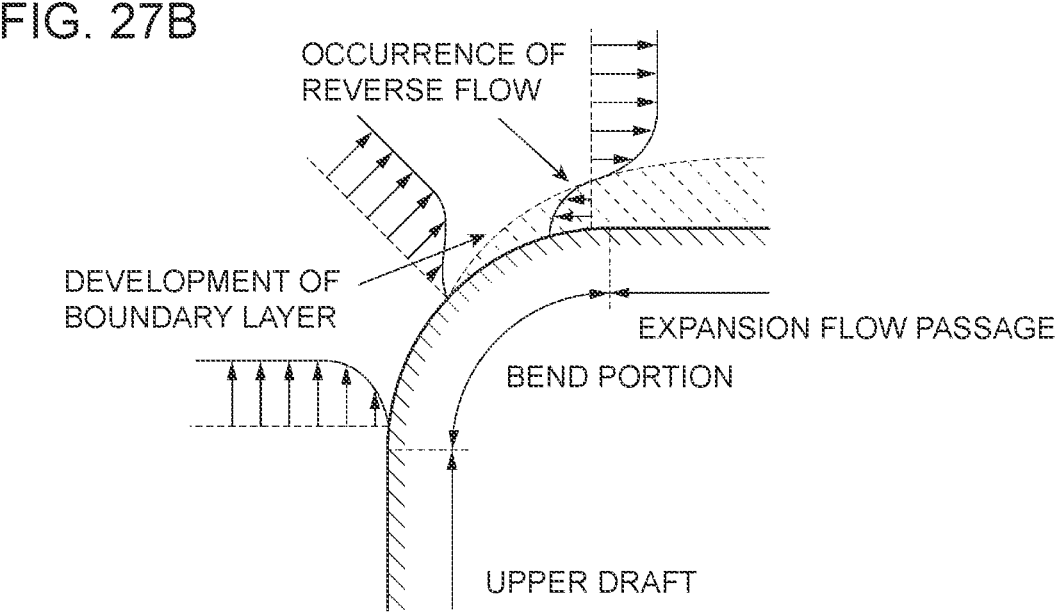
FIG. 27B is a diagram for describing the problem of a typical art.

Furthermore, as shown in FIG. 25, the bend pipe 100 described above may be applied to an outlet pipe 48 (discharge scroll) of a centrifugal compressor 40 serving as a fluid machine. That is, as shown in FIG. 25, in the centrifugal compressor 40 including an impeller wheel 44, a compressor casing 46 (see FIG. 24) covering the impeller wheel 44, and an outlet pipe 48 connected to the downstream side of the compressor casing 46 for discharging a fluid after passing through the impeller wheel 44, the outlet pipe 48 may be the bend pipe 100.

Embodiments of the present invention were described in detail above, but the present invention is not limited thereto, and various amendments and modifications may be implemented.

DESCRIPTION OF REFERENCE NUMERALS

2 Inlet pipe portion
2a Downstream end
4 Bend pipe portion
4A Side surface
4B Side surface
4a Downstream end
6 Outlet pipe portion
8 Outer inclined surface
10 Inclined surface
12 Inclined surface
14 Non-inclined surface
16 Inner inclined surface
18 Wall surface
20 Turbine
22 Inlet pipe
24 Impeller wheel
26 Turbine casing
28 Outlet pipe 30 Axial flow compressor
32 Inlet pipe
34 Impeller wheel
36 Compressor casing
38 Outlet pipe
40 Centrifugal compressor
42 Inlet pipe
44 Impeller wheel
46 Compressor casing
48 Outlet pipe
100 Bend pipe
A Flow-passage cross sectional area
A1 Flow-passage cross sectional area
A2 Maximum value
A3 Flow-passage cross sectional area
A2in Flow-passage cross sectional area
A2out Flow-passage cross sectional area
A4 Local maximum value
C Rotational direction
De Diameter
E Direction
G Gravity center
H Pipe axial center line
Hf Front-side eccentric portion
Hr Back-side eccentric portion
I Direction
J Direction
K Separation flow
L Line
M Line
N Intersection line
O Center
V Vertex position
Wa Flow-passage width
Wb Flow-passage width
d1 Distance
d2 Distance
m Pipe axial directional position
m2 Pipe axial directional position
m4 Pipe axial directional position

The invention claimed is:

1. A bend pipe for supplying a fluid to a fluid machine or discharging the fluid from the fluid machine, the bend pipe comprising:
an inlet pipe portion having a linear shape;
a bend pipe portion connected to a downstream end of the inlet pipe portion and configured to change a flow direction of the fluid; and
an outlet pipe portion having a linear shape connected to a downstream end of the bend pipe portion,
wherein, provided that: a line including a pipe axial center line of the inlet pipe portion and an extension line thereof is defined as a line L; a line including a pipe axial line of the outlet pipe portion and an extension line thereof is defined as a line M; and a direction parallel to an intersection line formed by a plane orthogonal to the line M and a plane orthogonal to the line L is defined as a direction I, and
when, as seen from the direction I, a side of the line M on which the inlet pipe portion exists is defined as a front side and a side of the line M on which the inlet pipe portion does not exist is defined as a back side,
a side surface on an outer side with respect to a bend direction of the bend pipe portion includes an outer inclined surface on the back side of the line M, the outer inclined surface being inclined so that a distance from the line M decreases toward a downstream side, and
wherein a side surface on an inner side with respect to the bend direction of the bend pipe portion includes an inner inclined surface on a downstream side with respect to a downstream end of the outer inclined surface, the inner inclined surface being inclined so that a distance from the line M decreases toward a downstream side.

2. The bend pipe according to claim 1,
wherein the bend pipe portion has, at least in a partial section, a flattened shape in which a flow passage width in a direction J orthogonal to the direction I is smaller than a flow passage width in the direction I.

3. The bend pipe according to claim 1,
wherein, as seen from the direction I, a maximum value α1 of an inclination angle formed by the outer inclined surface with a line parallel to the line M is not smaller than 10°.

4. The bend pipe according to claim 1,
wherein a pipe axial center line of the bend pipe portion has a back-side eccentric portion offset from the line M toward the back side.

5. The bend pipe according to claim 4,
wherein a diameter De of the outlet pipe portion and a distance δ1 between the line M and a portion of the back-side eccentric portion farthest from the line M toward the back side satisfy δ1≥0.1 De.

6. The bend pipe according to claim 1,
wherein a flow-passage cross sectional area at least in a partial section of the bend pipe portion is greater than a flow-passage cross sectional area A1 of the inlet pipe portion, and is greater than a flow-passage cross sectional area A3 of the outlet pipe portion.

7. The bend pipe according to claim 1,
wherein the bend pipe portion includes, at least in a partial section, a cross section on which a gravity center is positioned on an inner side, with respect to the bend direction, of a center of a flow passage width in a direction orthogonal to the direction I.

8. The bend pipe according to claim 1,
wherein the flattened shape is an oval shape, a rectangular shape, or a rectangular shape with four rounded corners.

9. The bend pipe according to claim 1,
wherein, as seen from the direction I, a maximum value α1 of an inclination angle formed by the outer inclined surface with a line parallel to the line M and a maximum value α2 of an inclination angle formed by the inner inclined surface with a line parallel to the line M satisfy α1≥α2.

10. The bend pipe according to claim 1,
wherein a pipe axial center line of the bend pipe portion has a back-side eccentric portion offset from the line M toward the back side and a front-side eccentric portion offset from the line M toward the front side on a downstream side of the back-side eccentric portion.

11. The bend pipe according to claim 10,
wherein a distance M between the line M and a portion of the back-side eccentric portion farthest from the line M toward the back side and a distance δ2 between the line M and a portion of the front-side eccentric portion farthest from the line M toward the front side satisfy δ1≥δ2.

12. A bend pipe for supplying a fluid to a fluid machine or discharging the fluid from the fluid machine, the bend pipe comprising:
an inlet pipe portion having a linear shape;

a bend pipe portion connected to a downstream end of the inlet pipe portion and configured to change a flow direction of the fluid; and an outlet pipe portion having a linear shape connected to a downstream end of the bend pipe portion, wherein, provided that: a line including a pipe axial center line of the inlet pipe portion and an extension line thereof is defined as a line L; a line including a pipe axial line of the outlet pipe portion and an extension line thereof is defined as a line M; and a direction parallel to an intersection line formed by a plane orthogonal to the line L and a plane orthogonal to the line M is defined as a direction I, when, as seen from the direction I, a side of the line M on which the inlet pipe portion exists is defined as a front side and a side of the line M on which the inlet pipe portion does not exist is defined as a back side, a side surface on an outer side with respect to a bend direction of the bend pipe portion includes an outer inclined surface on the back side of the line M, the outer inclined surface being inclined so that a distance from the line M decreases toward a downstream side, and wherein, in the bend pipe portion, a vertex position at which a flow passage width of each cross section of the bend pipe portion is at a maximum is shifted about a pipe axial center line of the bend pipe portion toward a downstream side from one side with respect to a vertex position located at an upper-most position of the bend pipe portion to another side with respect to the vertex position located at the upper-most position.

13. A fluid machine, comprising:

an impeller wheel;

a casing covering the impeller wheel;

an inlet pipe connected to an upstream side of the casing, for guiding a fluid to the impeller wheel; and an outlet pipe connected to a downstream side of the casing, for discharging a fluid after passing through the impeller wheel, wherein the inlet pipe or the outlet pipe comprises:

an inlet pipe portion having a linear shape;

a bend pipe portion connected to a downstream end of the inlet pipe portion and configured to change a flow direction of the fluid; and an outlet pipe portion having a linear shape connected to a downstream end of the bend pipe portion, wherein, provided that: a line including a pipe axial center line of the inlet pipe portion and an extension line thereof is defined as a line L; a line including a pipe axial line of the outlet pipe portion and an extension line thereof is defined as a line M; and a direction parallel to an intersection line formed by a plane orthogonal to the line M and a plane orthogonal to the line L is defined as a direction I, and when, as seen from the direction I, a side of the line M on which the inlet pipe portion exists is defined as a front side and a side of the line M on which the inlet pipe portion does not exist is defined as a back side, a side surface on an outer side with respect to a bend direction of the bend pipe portion includes an outer inclined surface on the back side of the line M, the outer inclined surface being inclined so that a distance from the line M decreases toward a downstream side, and wherein the bend pipe portion has, at least in a partial section, a flattened shape in which a flow passage width in a direction J orthogonal to the direction I is smaller than a flow passage width in the direction I.

14. The fluid machine according to claim 13, comprising a turbine, an axial flow compressor, or a centrifugal compressor.

* * * * *